(12) United States Patent
Joy

(10) Patent No.: US 11,630,229 B2
(45) Date of Patent: Apr. 18, 2023

(54) METAL DETECTORS, COMPONENTS OF METAL DETECTORS, AND METHODS OF DETECTING METAL

(71) Applicant: Patrick Joy, Johnson City, NY (US)

(72) Inventor: Patrick Joy, Johnson City, NY (US)

(*) Notice: Subject to any disclaimer, the term of this patent is extended or adjusted under 35 U.S.C. 154(b) by 0 days.

(21) Appl. No.: 17/193,868

(22) Filed: Mar. 5, 2021

(65) Prior Publication Data

US 2022/0283332 A1 Sep. 8, 2022

(51) Int. Cl.
*G01V 3/10* (2006.01)

(52) U.S. Cl.
CPC .................................... *G01V 3/10* (2013.01)

(58) Field of Classification Search
CPC ........................................................ G01V 3/10
USPC .......................................................... 324/329
See application file for complete search history.

(56) References Cited

U.S. PATENT DOCUMENTS

| 1,182,123 | A | | 5/1916 | Welles |
| 3,662,255 | A | | 5/1972 | Garrett |
| 4,262,553 | A | | 4/1981 | Bremer, Jr. |
| 4,797,618 | A | | 1/1989 | De Vries |
| 4,862,316 | A | | 8/1989 | Smith et al. |
| 5,109,610 | A | * | 5/1992 | Johnson ............. G01B 5/004 33/561 |
| 9,205,859 | B2 | | 12/2015 | Tinnin et al. |
| D756,247 | S | | 5/2016 | Pollock et al. |
| 9,851,466 | B2 | | 12/2017 | Weaver |
| 9,864,089 | B2 | | 1/2018 | Andel |
| D881,034 | S | | 4/2020 | Zhang |
| D881,035 | S | | 4/2020 | Zhang |
| D885,940 | S | | 6/2020 | Huang |
| D887,870 | S | | 6/2020 | Qin |
| 10,809,411 | B2 | | 10/2020 | Deng |

(Continued)

FOREIGN PATENT DOCUMENTS

| DE | 296 17 214 U1 | 1/1997 |
| DE | 20 2014 105 059 U1 | 1/2015 |

(Continued)

OTHER PUBLICATIONS

International Search Report and Written Opinion dated May 17, 2022 (Application No. PCT/US2022/070693).

*Primary Examiner* — Lee E Rodak
*Assistant Examiner* — Byung Ro Lee
(74) *Attorney, Agent, or Firm* — Brown & Brown IP Law PLLC

(57) ABSTRACT

A ground search metal detector, comprising a shaft, a probe, and a dual pivot axis-defining junction piece. The probe comprises an electromagnetic coil configured to generate a magnetic field. The shaft and the probe are each attached to the junction piece. The detector is configured to be adjusted between at least a first arrangement (in which the shaft is capable of pivoting relative to the junction piece about a first axis, and the probe is capable of pivoting relative to the junction piece about a second pivot axis that is non-parallel with the first pivot axis) and a second arrangement (in which the shaft is prevented from pivoting relative to the junction piece about a first pivot axis, or the probe is prevented from pivoting relative to the junction piece about a second pivot axis). Also, a probe assembly comprising a probe and a junction piece, and methods.

26 Claims, 10 Drawing Sheets

(56) References Cited

U.S. PATENT DOCUMENTS

2012/0238369 A1\* 9/2012 Billman .................. F16D 3/40
                                                               464/134
2017/0299756 A1 10/2017 Weaver et al.

FOREIGN PATENT DOCUMENTS

| JP | 2004-360856 A | 12/2004 |
|---|---|---|
| WO | 2019/115798 A1 | 6/2019 |

\* cited by examiner

METAL DETECTORS, COMPONENTS OF METAL DETECTORS, AND METHODS OF DETECTING METAL

FIELD OF THE INVENTION

The present invention relates to metal detectors. More particularly, the present invention relates to ground search metal detectors that employ a search coil and a shaft.

BACKGROUND

Metal detectors are available in a wide range of configurations, including walk-through metal detectors, hand-held metal detectors, and ground search metal detectors. Ground search metal detectors are commonly utilized in hobby, commercial, government and tactical applications. A ground search metal detector is commonly configured with a control assembly coupled to a stem, which is coupled to a probe that comprises at least one electromagnetic coil. In such devices, the control assembly includes, e.g., detection circuitry, displays, user actuators, a battery, and/or interface connectors. In such devices, typically, the stem is of a length that is suitable for a user to sweep the probe adjacent to the ground while the user stands or walks, holding the stem and/or the control assembly. It is common to include a handgrip portion and an arm cuff portion that facilitate comfortable carrying and operation of the metal detector.

A number of different types of ground search metal detectors are known. In many instances, generally flat in construction, search coils for metal detectors consist of a transmit coil and a receive coil, although it is possible to have a mono coil, in which a single coil works as both the transmit coil and the receive coil.

Representative examples of types of coils include (but are not limited to) concentric search coils, imaging coils, mono coils, "double-D" coils, and 2-box coils.

When powered, the transmit coil generates a magnetic field in the surrounding area, and if a metallic item is located within the field, the receive coil signal will become distorted. The receive coil then senses the distortion and sends a signal to the control housing, which alerts the user to the presence of a metallic object.

While not all detectors have the capability, some special models have a tertiary coil, which is generally just a second receive coil, that can further pinpoint the location of an object that is detected.

Typical functioning of ground search metal detectors includes a controller that—upon the sensor detecting electrically conductive material—generates a tone from the device audibly and/or through wired or wireless headphones typically worn by the user, and/or creates visual target identification via needles, graphs, bars, dots, blocks, numbers, symbols, words, letters, or any other non-audible methods, such as vibration as with a cellular phone, all independently or in various combinations and/or sequences, controlled or uncontrolled by the user.

BRIEF SUMMARY OF THE INVENTION

It is generally recommended that when operating a ground search metal detector, the user should keep the probe very close to the ground but without touching the ground, in order to avoid the possibility of making direct electrical contact with mineralization or other "ambient" material in the region being searched (e.g., dispersed throughout the soil or in some regions of the soil). Doing so, especially over extended periods of time, e.g. while moving the metal detector over a large area, is a practical impossibility.

In actual practice, users tend to rest the probe on the surface of the region being searched, and slide the probe around on the surface. In fact, it is a generally accepted condition accounted for by the normal use of an accessory "skidplate" to protect the bottom and sides of metal detector search coils. The aforementioned skidplate/cover is generally provided by the search coil manufacturer as standard equipment, and its use is recommended under all conditions. The fact is that the closer the transmit coil is to the ground, the deeper the detection signal reaches. So many users do, and are often known to say "keep your coil to the soil." So, in fact, many users not only use ground search metal detectors contrary to the general instruction of use, but they prefer to, for example, keep the probe firmly pushing down grass and/or sliding in contact with bare earth, in many cases based on the notion that such is the best way to achieve maximum depth capabilities. Many such users are able to distinguish between (1) readings caused by, e.g., mineralization in the region being searched (or other "ambient" material), vs. (2) readings caused by objects being sought (e.g., buried electrically conductive material such as coins), and so they can disregard readings caused by mineralization upon the probe coming into contact with the surface of the region being searched.

A very significant limitation on the use of ground search metal detectors (and therefore, their usefulness) is user fatigue (and sometimes pain). Fatigue can lead to a user stopping use of the ground search metal detector (and/or taking frequent breaks), and/or to such user operating the detector in a way that is not optimal.

Many users are in excellent physical shape and can operate ground search metal detectors for very long periods of time. Even such users, however, eventually become fatigued, and in many cases would prefer to be able to operate the detector for a longer period of time and/or with less fatigue or pain. Many other users are not in excellent physical shape, and/or are older, and/or have had one or more injuries, and fatigue (and/or pain) can be a significant limitation on the usefulness of ground search metal detectors for such users (e.g., severely limiting the area that such users are able to search in a given period of time, or in a day).

The present inventive subject matter provides ground search metal detectors (and components for ground search metal detectors) that, for many users, provides a surprisingly significant reduction in fatigue (and in many cases provides other benefits described herein). The present inventive subject matter further provides methods that similarly provide a surprising reduction in fatigue and/or that provide other benefits.

In accordance with a first aspect of the present inventive subject matter, there is provided a ground search metal detector, comprising:

a shaft, a probe, and a dual pivot axis-defining junction piece, the probe comprising at least a first electromagnetic coil, the first electromagnetic coil configured to generate a magnetic field upon electric current being passed through the first electromagnetic coil, the shaft attached to the dual pivot axis-defining junction piece, the probe attached to the dual pivot axis-defining junction piece, the ground search metal detector configured to be adjusted between at least a first arrangement and a second arrangement, wherein:

in the first arrangement:
the shaft is capable of pivoting relative to the dual pivot axis-defining junction piece about a first pivot axis, and
the probe is capable of pivoting relative to the dual pivot axis-defining junction piece about a second pivot axis, the second pivot axis non-parallel with respect to the first pivot axis, and in the second arrangement:
the shaft is prevented from pivoting relative to the dual pivot axis-defining junction piece, and
the probe is capable of pivoting relative to the dual pivot axis-defining junction piece about the second pivot axis.

The inventive subject matter may be more fully understood with reference to the accompanying drawings and the following detailed description of the inventive subject matter.

BRIEF DESCRIPTION OF THE DRAWING FIGURES

Figure 7:
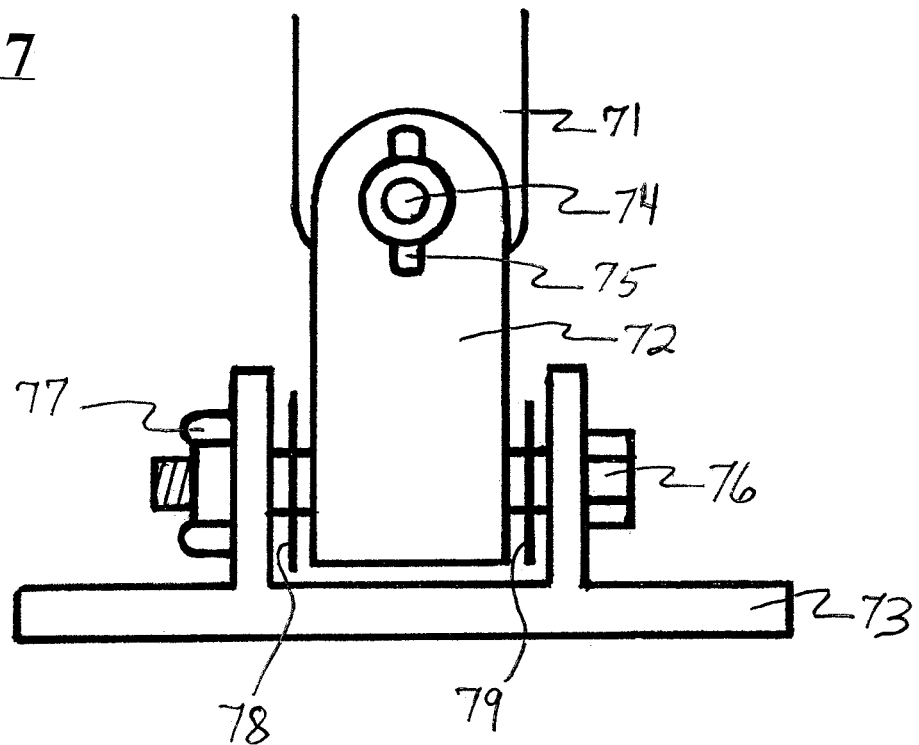
FIG. 7 is a front view of the portion of the ground search metal detector 70 in a first arrangement.
Figure 15:
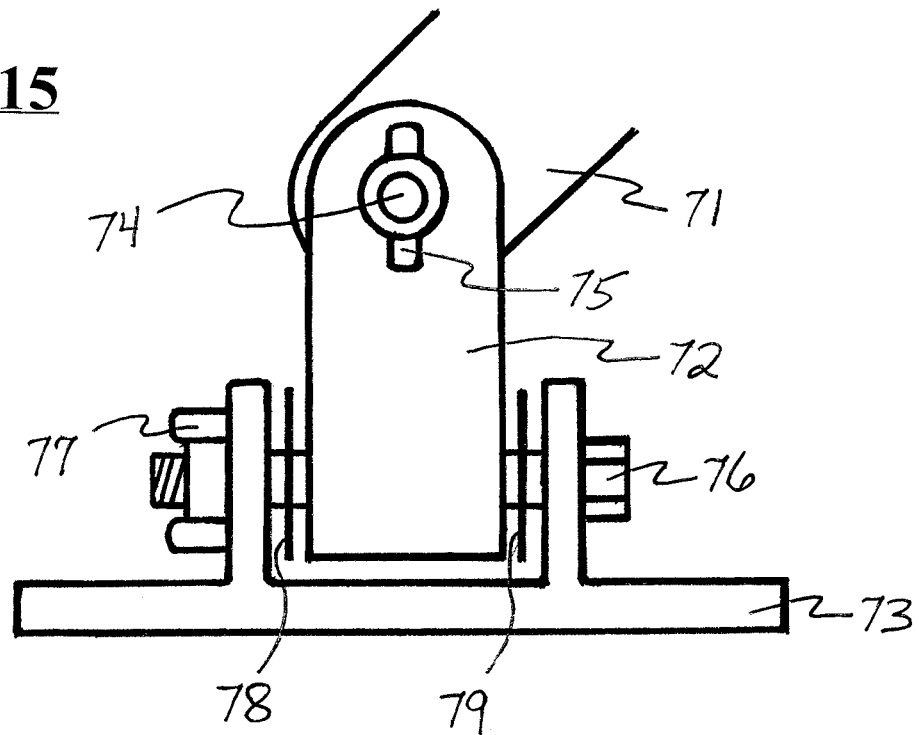

FIG. 15 is a front view of the portion of the ground search metal detector 70 in the first arrangement, with the shaft 71 pivoted relative to the dual pivot axis-defining junction piece 72 to a pivot position that differs from its pivot position depicted in FIG. 7.

Figure 8:
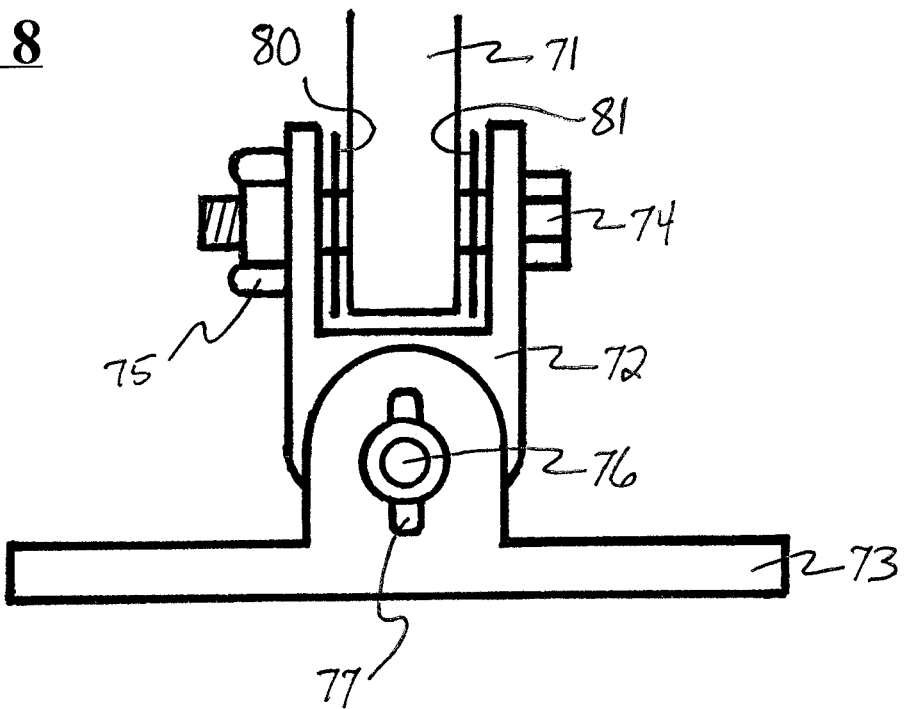
FIG. 8 is a side view of the portion of the ground search metal detector 70 in the first arrangement.
Figure 16:
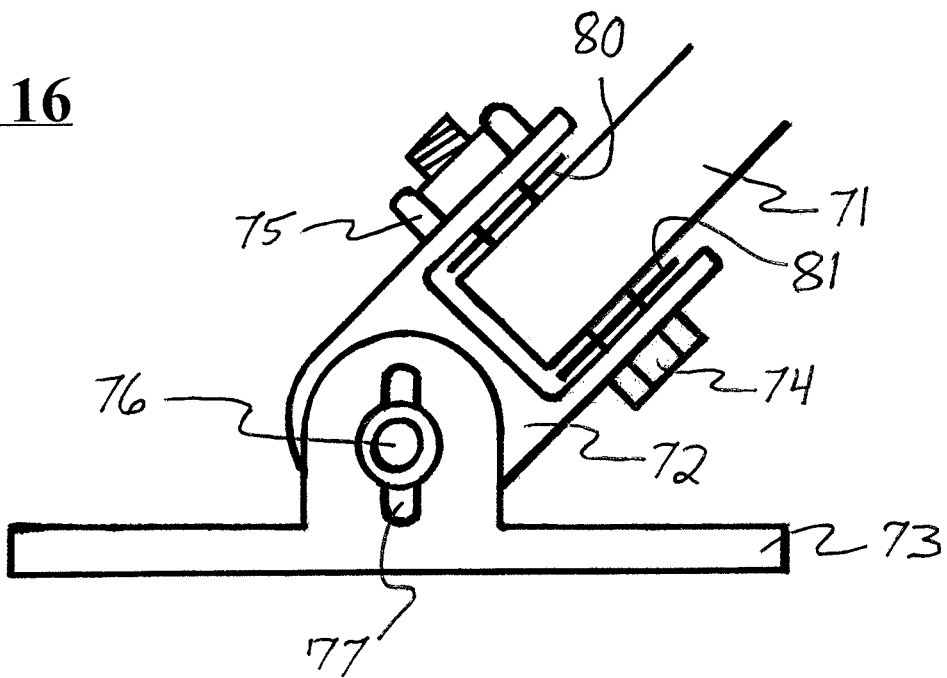

FIG. 16 is a front view of the portion of the ground search metal detector 70 in the first arrangement, with the probe 73 pivoted relative to the dual pivot axis-defining junction piece 72 to a pivot position that differs from its pivot position depicted in FIG. 8.

DETAILED DESCRIPTION OF THE INVENTION

The expression "comprises" or "comprising," as used herein (e.g., in the expression "a ground search metal detector, comprising: a shaft, a probe, and a dual pivot axis-defining junction piece"), is used in accordance with its well known usage, and means that the item that "comprises" the recited elements (or that is "comprising" the recited elements) includes at least the recited elements, and can optionally include any additional elements. For example, an item that "comprises a shaft, a probe, and a dual pivot axis-defining junction piece" includes at least one shaft, i.e., it can include a single shaft or a plurality of shafts.

The expression "attached" in relation to a first element being "attached" to a second element (e.g., in the expression "the shaft is attached to the dual pivot axis-defining junction piece"), means that the first element cannot be separated from the second element without removing a connector (e.g., a screw or a bolt) or applying a significant force (e.g., at least 1,000 N). The expression "attached" encompasses situations where the first element is "directly attached" to the second element, as well as situations where the first element is "indirectly attached" to the second element, i.e., where there are one or more intervening elements (e.g., the first element is directly attached to a third element, and the third element is directly attached to the second element, in which case the third element is an "intervening element").

The expression "pivotally attached" in relation to a first element being "pivotally attached" to a second element (e.g., in the expression "the probe is pivotally attached to the dual pivot axis-defining junction piece"), means that the first element is attached to the second element, and that the first element is capable of being pivoted relative to the second element about a pivot axis (by application force) without breaking, twisting or altering the shape of either the first element or the second element.

The expression "skew and substantially perpendicular," as used herein in relation to first and second imaginary lines, means that the first and second imaginary lines are skew (i.e., they do not intersect, they are not parallel and they are not co-linear), and that either of the lines can be translated along an imaginary line segment (that connects the closest respective two points on the two imaginary lines) to a position where the first and second imaginary lines are substantially perpendicular.

The expression "substantially perpendicular," as used herein in relation to two imaginary lines (e.g., first and second imaginary lines), means that either of the imaginary lines could become perpendicular to the other line by being tilted in any direction by not more than 5 degrees.

The expression "pivot axis" is used herein in accordance with its common usage to refer an axis about which a structure can be pivoted, it being recognized that structures do not always exhibit idealized pivoting precisely about a single imaginary line, and that some degree of "wobble" is inevitable (e.g., apparent upon magnification), and thus recognizing that an imaginary line defined by such pivot axis can tilt in any direction (or directions) about any point by up to 5 degrees during pivoting.

The expression "capable of pivoting," as used herein in relation to a first element being "capable of pivoting" relative to a second element, means that the first element can be caused to pivot relative to the second element by administering a force of not greater than 200 N.

The expression "prevented from pivoting," as used herein in relation to a first element being "prevented from pivoting" relative to a second element, means that the first element cannot be caused to pivot relative to the second element by administering a force of 300 N or less.

The expression "substantially cylindrical", as used herein in relation to a surface, means that at least 95 percent of the points in the surface that is characterized as being substantially cylindrical are located on one of or between a pair of imaginary cylindrical structures that are spaced from each other by a distance of not more than 5 percent of their largest dimension.

The expression "defining at least a first substantially cylindrical space" (and other forms, e.g., "defines at least a first substantially cylindrical space"), as used herein, means that structure that is "defining at least a first substantially cylindrical space" includes regions by which a substantially cylindrical space is defined, e.g., a cylindrical structure having a cylinder axis can be placed in the substantially cylindrical space (after removing anything in the substantially cylindrical space) and can be pivoted (or rotated) therein about a first axis, and during such pivoting or rotating, the cylindrical structure is prevented from moving such that the cylinder axis varies by more than 5 degrees from the first axis or any line parallel to the first axis. For example, a substantially cylindrical aperture in a structure defines a substantially cylindrical space. In addition, a structure that comprises a region that has a C-shaped concave cylindrical surface that extends 350 degrees around a cylinder axis (or that extends 340 degrees, or 300 degrees, or 250 degrees, or 200 degrees, or 181 degrees around a cylinder axis) defines a substantially cylindrical space. Similarly, a structure that comprises a region that corresponds to an internal cylindrical surface with holes and/or recesses in 10 percent (or 20 percent, or 30 percent, or 40 percent, or 50 percent) of its surface area defines a substantially cylindrical space.

The expression "axis of substantial symmetry", as used herein, when referring to a structure (e.g., in the expression "the first substantially cylindrical space having a first axis of substantial symmetry") refers to a straight line about which the structure is substantially symmetrical, i.e., about which the structure is symmetrical or about which the structure would be symmetrical by moving, adding, or removing volume totaling not more than 10 percent of the volume of the structure.

The expression "electromagnetic coil," as used herein, means an electrical conductor (in any form, e.g., in the form of a wire) in the shape of a coil, spiral or helix. An electromagnetic coil is configured to generate a magnetic field upon electric current being passed through the electromagnetic coil, and/or (conversely) to induce a current in the electromagnetic coil upon an external time-varying magnetic field being provided through the interior of the electromagnetic coil. Any electrical conductor creates a circular magnetic field around the conductor upon current being passed through the conductor. By arranging the conductor in a coil shape, a greater strength of the magnetic field is produced by a given current. The magnetic fields generated by the separate turns of the conductor all pass through the center of the coil and add (superpose) to increase the strength of the field that is produced. The more turns of wire (all other things being equal), the stronger the field produced. Analogously, providing the electrical conductor as a coil increases the voltage of current induced in the conductor upon being subjected to a changing external magnetic flux. The expression "electromagnetic coil" encompasses all components that are referred to as "coils", "electromagnetic coils," "transmit coils," "receive coils," etc. in the field of ground search metal detectors. A "coil" is not limited to circular, D-shaped, cylindrical, or any other specific shape.

Unless otherwise defined, all terms (including technical and scientific terms) used herein have the same meaning as commonly understood by one of ordinary skill in the art to which this inventive subject matter belongs. Terms and expressions, such as those defined in commonly used dictionaries, should be interpreted as having meaning that is consistent with their meaning in the context of the relevant art and the present disclosure, and not in an idealized or overly formal sense unless expressly so defined herein.

As noted above, in accordance with a first aspect of the present inventive subject matter, there is provided a ground search metal detector, comprising:
 a shaft,
 a probe, and
 a dual pivot axis-defining junction piece,
 the probe comprising at least a first electromagnetic coil,
 the first electromagnetic coil configured to generate a magnetic field upon electric current being passed through the first electromagnetic coil,
 the shaft attached to the dual pivot axis-defining junction piece,
 the probe attached to the dual pivot axis-defining junction piece,
 the ground search metal detector configured to be adjusted between at least a first arrangement and a second arrangement, wherein:
  in the first arrangement:
   the shaft is capable of pivoting relative to the dual pivot axis-defining junction piece about a first pivot axis, and
   the probe is capable of pivoting relative to the dual pivot axis-defining junction piece about a second pivot axis, the second pivot axis non-parallel with respect to the first pivot axis, and
  in the second arrangement:
   the shaft is prevented from pivoting relative to the dual pivot axis-defining junction piece, and
   the probe is capable of pivoting relative to the dual pivot axis-defining junction piece about the second pivot axis.

In some embodiments in accordance with the first aspect of the prevent inventive subject matter:
 the ground search metal detector further comprises at least a first connector,
 the shaft is attached to the dual axis-defining junction piece by the first connector,
 the first connector is adjustable between at least a first connector pivotable arrangement and a first connector non-pivotable arrangement,
 with the first connector in the first connector pivotable arrangement, the shaft is capable of pivoting relative to the dual pivot axis-defining junction piece about the first pivot axis,
 with the first connector in the first connector non-pivotable arrangement, the shaft is prevented from pivoting relative to the dual pivot axis-defining junction piece.

In some embodiments in accordance with the first aspect of the prevent inventive subject matter:
 the ground search metal detector is configured to be adjusted between the first arrangement, the second arrangement, and at least a third arrangement,
 wherein in the third arrangement:
  the shaft is prevented from pivoting relative to the dual pivot axis-defining junction piece, and
  the probe is prevented from pivoting relative to the dual pivot axis-defining junction piece.

In some embodiments in accordance with the first aspect of the prevent inventive subject matter:
 the ground search metal detector further comprises at least a first connector and a second connector, the shaft is attached to the dual axis-defining junction piece by the first connector, the first connector is adjustable between at least a first connector pivotable arrangement and a first connector non-pivotable arrangement, the probe is attached to the dual axis-defining junction piece by the second connector, the second connector is adjustable between at least a second connector pivotable arrangement and a second connector non-pivotable arrangement, with the first connector in the first connector pivotable arrangement and the second connector in the second connector pivotable arrangement, the ground search metal detector is in the first arrangement, with the first connector in the first connector non-pivotable arrangement and the second connector in the second connector pivotable arrangement, the ground search metal detector is in the second arrangement.

with the first connector in the first connector non-pivotable arrangement and the second connector in the second connector non-pivotable arrangement, the ground search metal detector is in the third arrangement.

In some embodiments in accordance with the first aspect of the prevent inventive subject matter:

the dual pivot axis-defining junction piece comprises a first pivot axis-defining region and a second pivot axis-defining region, the first pivot axis-defining region defines the first pivot axis, and the second pivot axis-defining region defines the second pivot axis. In some of such embodiments:

the first pivot axis-defining region comprises at least a first substantially cylindrical aperture, the second pivot axis-defining region comprises at least a second substantially cylindrical aperture.

In some embodiments in accordance with the first aspect of the prevent inventive subject matter, the second pivot axis is skew and substantially perpendicular to the first pivot axis.

In some embodiments in accordance with the first aspect of the prevent inventive subject matter:

the shaft comprises a shaft first end and a shaft second end, the shaft first end is within 4 inches of the first pivot axis, and the shaft second end is at least 3 feet away from the shaft first end.

In some embodiments in accordance with the first aspect of the prevent inventive subject matter:

the ground search metal detector further comprises an arm bracket, and the arm bracket is attached to the shaft.

In some embodiments in accordance with the first aspect of the prevent inventive subject matter:

the ground search metal detector further comprises a controller, and the controller is attached to the shaft.

In some embodiments in accordance with the first aspect of the prevent inventive subject matter:

the shaft comprises at least a first shaft portion, a second shaft portion, and at least a first tightening element, the first tightening element is configured to be movable between a first tightening element first position and a first tightening element second position, with the first tightening element in the first tightening element first position, the first shaft portion is movable relative to the second shaft portion to alter the overall length of the shaft using a force of less than 200 N, and with the first tightening element in the first tightening element second position, the first shaft portion is not movable relative to the second shaft portion using a force of less than 300 N.

In accordance with a second aspect of the present inventive subject matter, there is provided a ground search metal detector, comprising:

a shaft, a probe, and a dual pivot axis-defining junction piece, the probe comprising at least a first electromagnetic coil, the first electromagnetic coil configured to generate a magnetic field upon electric current being passed through the first electromagnetic coil, the shaft attached to the dual pivot axis-defining junction piece, the probe attached to the dual pivot axis-defining junction piece, the ground search metal detector configured to be adjusted between at least a first arrangement and a second arrangement, wherein:

in the first arrangement:

the shaft is capable of pivoting relative to the dual pivot axis-defining junction piece about a first pivot axis, and the probe is capable of pivoting relative to the dual pivot axis-defining junction piece about a second pivot axis, the second pivot axis non-parallel with respect to the first pivot axis, and in the second arrangement:

the probe is prevented from pivoting relative to the dual pivot axis-defining junction piece, and the shaft is capable of pivoting relative to the dual pivot axis-defining junction piece about the first pivot axis.

In some embodiments in accordance with the second aspect of the prevent inventive subject matter:

the ground search metal detector further comprises at least a first connector, the dual axis-defining junction piece is attached to the probe by the first connector, the first connector is adjustable between at least a first connector pivotable position and a first connector non-pivotable position, with the first connector in the first connector pivotable position, the probe is capable of pivoting relative to the dual pivot axis-defining junction piece about the second pivot axis, with the first connector in the first connector non-pivotable position, the probe is prevented from pivoting relative to the dual pivot axis-defining junction piece.

In some embodiments in accordance with the second aspect of the prevent inventive subject matter:

the dual pivot axis-defining junction piece comprises a first pivot axis-defining region and a second pivot axis-defining region, the first pivot axis-defining region defines the first pivot axis, and the second pivot axis-defining region defines the second pivot axis. In some of such embodiments:

the first pivot axis-defining region comprises at least a first substantially cylindrical aperture, the second pivot axis-defining region comprises at least a second substantially cylindrical aperture.

In some embodiments in accordance with the second aspect of the prevent inventive subject matter, the second pivot axis is skew and substantially perpendicular to the first pivot axis.

In accordance with a third aspect of the present inventive subject matter, there is provided a probe assembly for a ground search metal detector, the probe assembly comprising:
  a probe, and
  a dual pivot axis-defining junction piece,
  the probe comprising at least a first electromagnetic coil,
  the first electromagnetic coil configured to generate a magnetic field upon electric current being passed through the first electromagnetic coil,
  the probe attached to the dual pivot axis-defining junction piece,
  the dual pivot axis-defining junction piece comprising a first region and a second region,
  the first region defining at least a first substantially cylindrical space, the first substantially cylindrical space having a first axis of substantial symmetry,
  the second region defining at least a second substantially cylindrical space, the second substantially cylindrical space having a second axis of substantial symmetry,
  the second axis of substantial symmetry skew and substantially perpendicular with respect to the first axis of substantial symmetry.

In some embodiments in accordance with the third aspect of the prevent inventive subject matter:
  the ground search metal detector further comprises at least a first connector,
  the dual axis-defining junction piece is attached to the probe by the first connector,
  the first connector is adjustable between at least a first connector pivotable position and a first connector non-pivotable position,
  with the first connector in the first connector pivotable position, the probe is capable of pivoting relative to the dual pivot axis-defining junction piece about the first axis of substantial symmetry,
  with the first connector in the first connector non-pivotable position, the probe is prevented from pivoting relative to the dual pivot axis-defining junction.

In accordance with a fourth aspect of the present inventive subject matter, there is provided a method of searching for ground metal, comprising:
  causing a shaft of a ground search metal detector to pivot relative to a dual pivot axis-defining junction piece about a first pivot axis, the ground search metal detector comprising the shaft, the dual pivot axis-defining junction piece, and a probe, the probe comprising at least a first electromagnetic coil, the first electromagnetic coil configured to generate a magnetic field upon electric current being passed through the first electromagnetic coil,
  causing the probe of the ground search metal detector to pivot relative to the dual pivot axis-defining junction piece about a second pivot axis, the second pivot axis non-parallel with respect to the first pivot axis.

In some embodiments in accordance with the fourth aspect of the prevent inventive subject matter:
  the dual pivot axis-defining junction piece comprises a first pivot axis-defining region and a second pivot axis-defining region,
  the first pivot axis-defining region defines the first pivot axis, and
  the second pivot axis-defining region defines the second pivot axis. In some of such embodiments:
    the first pivot axis-defining region comprises at least a first substantially cylindrical aperture,
    the second pivot axis-defining region comprises at least a second substantially cylindrical aperture.

In some embodiments in accordance with the fourth aspect of the prevent inventive subject matter, the second pivot axis is skew and substantially perpendicular to the first pivot axis.

In accordance with a fifth aspect of the present inventive subject matter, there is provided a method of searching for ground metal, comprising:
  adjusting a first connector from a first connector pivotable arrangement to a first connector non-pivotable arrangement,
  the first connector attaching a shaft of a ground search metal detector to a dual axis-defining junction piece of the ground search metal detector, the ground search metal detector comprising the first connector, the shaft, the dual axis-defining junction piece and a probe, the probe comprising at least a first electromagnetic coil, the first electromagnetic coil configured to generate a magnetic field upon electric current being passed through the first electromagnetic coil, the probe attached to the pivot axis-defining junction piece,
  the probe capable of pivoting relative to the dual pivot axis-defining junction piece about a first pivot axis,
  with the first connector in the first connector pivotable arrangement, the shaft is capable of pivoting relative to the dual pivot axis-defining junction piece about a second pivot axis, the second pivot axis non-parallel with respect to the first pivot axis, and
  with the first connector in the first connector non-pivotable arrangement, the shaft is prevented from pivoting relative to the dual pivot axis-defining junction piece.

In some embodiments in accordance with the fifth aspect of the prevent inventive subject matter, the third pivot axis is skew and substantially perpendicular to the first pivot axis.

In some embodiments in accordance with the fifth aspect of the prevent inventive subject matter:
  the dual pivot axis-defining junction piece comprises a first pivot axis-defining region and a second pivot axis-defining region,
  the first pivot axis-defining region defines the first pivot axis, and
  the second pivot axis-defining region defines the second pivot axis.

In accordance with a sixth aspect of the present inventive subject matter, there is provided a method of searching for ground metal, comprising:
  adjusting a first connector from a first connector pivotable arrangement to a first connector non-pivotable arrangement,
  the first connector attaching a probe of a ground search metal detector to a dual axis-defining junction piece of the ground search metal detector, the ground search metal detector comprising the first connector, the probe, the dual axis-defining junction piece and a shaft, the probe comprising at least a first electromagnetic coil, the first electromagnetic coil configured to generate a magnetic field upon electric current being passed through the first electromagnetic coil, the shaft attached to the pivot axis-defining junction piece,
  the shaft capable of pivoting relative to the dual pivot axis-defining junction piece about a first pivot axis,
  with the first connector in the first connector pivotable arrangement, the probe is capable of pivoting relative to the dual pivot axis-defining junction piece about a second pivot axis, the second pivot axis non-parallel with respect to the first pivot axis, and with the first connector in the first connector non-pivotable arrangement, the probe is prevented from pivoting relative to the dual pivot axis-defining junction piece.

In some embodiments in accordance with the sixth aspect of the prevent inventive subject matter, the second pivot axis is skew and substantially perpendicular to the first pivot axis.

In some embodiments in accordance with the sixth aspect of the prevent inventive subject matter:

the dual pivot axis-defining junction piece comprises a first pivot axis-defining region and a second pivot axis-defining region, the first pivot axis-defining region defines the first pivot axis, and the second pivot axis-defining region defines the second pivot axis.

In any embodiments in accordance with the present inventive subject matter that comprise a shaft (e.g., any embodiments in accordance with the first, second, fourth, fifth or sixth aspects), the shaft can comprise any suitable material or combination of materials, including materials or combinations of material, preferably a non-electrically conductive material or combination of materials (e.g., non-metals).

In some embodiments in accordance with the present inventive subject matter, including some embodiments that include or do not include any of the features described herein, a shaft is provided that has one of more shaft portions, e.g., an upper shaft portion and a lower shaft portion (or an upper shaft portion, a middle shaft portion and a lower shaft portion). In some of such embodiments, at least one shaft portion is capable of telescoping relative to another shaft portion, and/or one shaft portion is held in place relative to another shaft portion, e.g., by a nut that is threaded on respective threads on the two shaft portions, or by a tightening element (e.g., a compression locking nut, i.e., a threaded nut that is threaded on threads of one of the shaft portions and that is configured such that upon rotating the compression locking nut in one direction, the compression locking nut exerts greater inward force on the outer one of the telescoping shaft portions, pressing it against the inner one of the telescoping shaft portions).

In some embodiments in accordance with the present inventive subject matter, including some embodiments that include or do not include any of the features described herein, a shaft, or one or more respective shaft portions, is/are substantially cylindrical and elongated. For example, some embodiments comprise a shaft (or shaft portion) that has a first end and a second end, in which the second end is at least 2 feet (or 3 feet, or 4 feet) away from the first end, and an imaginary line (i.e., a longitudinal axis of the shaft or shaft portion) extends within the shaft from the first end to the second end, and no dimension of the shaft in any imaginary plane perpendicular to such imaginary line extends more than 6 inches (or 4 inches, or 3 inches, or 2 inches, or 1 inch).

In some embodiments in accordance with the present inventive subject matter, including some embodiments that include or do not include any of the features described herein, a shaft, or a shaft portion that is attached to the dual pivot axis-defining junction piece comprises a region that defines at least a first substantially cylindrical space (e.g., through which a connector extends, such connector also extending through a substantially cylindrical space in a region of the dual pivot axis-defining junction piece, to pivotally attach the shaft to the dual pivot axis-defining junction piece). In some of such embodiments, the first substantially cylindrical space has a cylinder axis that is substantially perpendicular to an axis of the shaft (e.g., a cylinder axis of the shaft and/or a longitudinal axis of the shaft).

As noted above, probes in embodiments in accordance with the present invention comprise at least a first electromagnetic coil. The electromagnetic coil (or coils) can comprise any material or combination of materials that is configured to generate a magnetic field upon electric current being passed through the electromagnetic coil.

In some embodiments in accordance with the present inventive subject matter, including some embodiments that include or do not include any of the features described herein, the probe further comprises a probe housing that extends on or around at least part of the electromagnetic coil(s). For example, a probe housing can completely surround the electromagnetic coil(s), or it can partially surround the electromagnetic coil(s) (e.g., corresponding to a housing that completely surrounds the electromagnetic coil(s) but in which there are one or more gaps or holes). In such embodiments, the probe housing can be made of any suitable material or materials, depending on whether it is desired for the probe housing to affect a magnetic field (or fields) or an induced current in any way. In some embodiments, the probe is generally disc-shaped, e.g., with top and bottom major surfaces (e.g., the top and bottom surfaces together account for at least 75 percent—and in some embodiments at least 85 percent—of the overall surface area of the entire probe), which major surfaces can be substantially flat, convex or concave (e.g., in which the dimension perpendicular to an imaginary plane with the maximum area of intersection with the probe is not greater than 10 percent of the largest dimension of the probe in such imaginary plane).

In some embodiments in accordance with the present inventive subject matter, including some embodiments that include or do not include any of the features described herein, the probe further comprises a region that defines at least a first substantially cylindrical space (e.g., through which a connector extends, such connector also extending through a substantially cylindrical space in a region of the dual pivot axis-defining junction piece, to pivotally attach the probe to the dual pivot axis-defining junction piece). In some of such embodiments, the first substantially cylindrical space has a cylinder axis that is substantially parallel to at least one major surface of the probe (e.g., the cylinder axis defines an angle of not more than 10 degrees relative to an imaginary plane with the maximum area of intersection with the probe).

In any embodiments in accordance with the present inventive subject matter, the dual pivot axis-defining junction piece can comprise any suitable material or combination of materials.

In some embodiments in accordance with the present inventive subject matter, including some embodiments that include or do not include any of the features described herein, the dual pivot axis-defining junction piece comprises a region that defines a substantially cylindrical first space (a cylinder axis of which defines a first pivot axis), and a region that defines a substantially cylindrical second space (a cylinder axis of which defines a second pivot axis, the second pivot axis being non-parallel with respect to the first pivot axis). In some of such embodiments, the second pivot axis is skew and substantially perpendicular to the first pivot axis.

In some embodiments in accordance with the present inventive subject matter, including some embodiments that include or do not include any of the features described herein, the dual pivot axis-defining junction piece comprises at least first and second regions that define respective first and second substantially cylindrical spaces (respective cylinder axes of which each define the same first pivot axis), and a third region that defines a third substantially cylindrical space (a cylinder axis of which defines a second pivot axis, the second pivot axis being non-parallel with respect to the first pivot axis). In some of such embodiments, the second pivot axis is skew and substantially perpendicular to the first pivot axis.

In some embodiments in accordance with the present inventive subject matter, including some embodiments that include or do not include any of the features described herein, the probe is pivotally attached to the dual pivot axis-defining junction piece by a connector that comprises a region that extends through at least (1) a space (in some instances, a substantially cylindrical space) defined in a region of the probe and (2) a space (in some instances, a substantially cylindrical space) defined in a region of the dual pivot axis-defining junction piece.

In some embodiments in accordance with the present inventive subject matter, including some embodiments that include or do not include any of the features described herein, a shaft is pivotally attached to the dual pivot axis-defining junction piece by a connector that comprises a region that extends through at least (1) a space (in some instances, a substantially cylindrical space) defined in a region of the shaft and (2) a space (in some instances, a substantially cylindrical space) defined in a region of the dual pivot axis-defining junction piece.

In some embodiments in accordance with the present inventive subject matter, including some embodiments that include or do not include any of the features described herein, a probe is attached to a dual pivot axis-defining junction piece, and/or a shaft is attached to a dual pivot axis-defining junction piece, by an "ears/post" attachment, i.e., where one component comprises first and second "ears" and the other component comprises a "post," the first ear, the second ear and the post each comprise a region that defines a space (in some instances, a substantially cylindrical space), and the ears and the post are arranged with the post sandwiched (in some instances snugly) between the ears, with the ears and the post aligned such that a connector can extend through the respective spaces defined in each. For example, in some embodiments:

a first connector extends through (1) respective substantially cylindrical spaces defined in two ears of the dual pivot axis-defining junction piece and (2) a substantially cylindrical space defined in a post of the shaft, and
  a second connector extends through (1) respective substantially cylindrical spaces defined in two ears of the probe and (2) a substantially cylindrical space defined in a post of the dual pivot axis-defining junction piece.
In other embodiments:
  a first connector extends through (1) respective substantially cylindrical spaces defined in two ears of the dual pivot axis-defining junction piece and (2) a substantially cylindrical space defined in a post of the shaft, and
  a second connector extends through (1) respective substantially cylindrical spaces defined in two ears of the dual pivot axis-defining junction piece and (2) a substantially cylindrical space defined in a post of the probe.
In other embodiments:
  a first connector extends through (1) respective substantially cylindrical spaces defined in two ears of the shaft and (2) a substantially cylindrical space defined in a post of the dual pivot axis-defining junction piece, and
  a second connector extends through (1) respective substantially cylindrical spaces defined in two ears of the dual pivot axis-defining junction piece and (2) a substantially cylindrical space defined in a post of the probe.
In other embodiments:
  a first connector extends through (1) respective substantially cylindrical spaces defined in two ears of the shaft and (2) a substantially cylindrical space defined in a post of the dual pivot axis-defining junction piece, and
  a second connector extends through (1) respective substantially cylindrical spaces defined in two ears of the probe and (2) a substantially cylindrical space defined in a post of the dual pivot axis-defining junction piece.
In other embodiments, both components can comprise two or more ears which can be aligned such that a connector can extend through spaces defined in each of the respective ears.

In some embodiments in accordance with the present inventive subject matter, including some embodiments that include or do not include any of the features described herein, any component can have, instead of a space (e.g., a substantially cylindrical space) through which a connector extends, one or more clampable regions. For example, instead of an aperture (that defines a space through which a connector extends), a component can have a pair of clampable regions on opposite sides of a connector, such that the connector is able to hold the component in place (e.g., pivotably), and preferably in such cases the clampable region extend far enough around the connector that the component is prevented from dislodging from the connector while being capable of allowing the component to pivot about an axis along the connector.

In any embodiments in accordance with the present inventive subject matter, a connector can comprise any suitable material or combination of materials.

In some embodiments in accordance with the present inventive subject matter, including some embodiments that include or do not include any of the features described herein, a connector comprises a bolt and a nut (and optionally one or more washers), or a bolt and a wingnut (and optionally one or more washers, in some embodiments, in a sufficient number and/or of sufficient size(s) to provide as much spacing as is desired).

In some embodiments in accordance with the present inventive subject matter, including some embodiments that include or do not include any of the features described herein, a shaft is attached to a dual pivot axis-defining junction piece by a first connector that comprises a first bolt and a first wingnut (and optionally one or more washers), and a probe is attached to the dual pivot axis-defining junction piece by a second connector that comprises a second bolt and a second wingnut (and optionally one or more washers), and by threading or un-threading the first wingnut relative to the first bolt, the shaft can selectively be prevented from pivoting relative to the dual pivot axis-defining junction piece or capable of pivoting relative to the dual pivot axis-defining junction piece, respectively, and by threading or un-threading the second wingnut relative to the second bolt, the probe can selectively be prevented from pivoting relative to the dual pivot axis-defining junction piece or capable of pivoting relative to the dual pivot axis-defining junction piece, respectively. In such embodiments, by manipulation of the first and second wingnuts relative to their respective bolts, the ground search metal detector is capable of being selectively put in any of the following four arrangements:

a first arrangement, in which the shaft is capable of pivoting relative to the dual pivot axis-defining junction piece about a first pivot axis, and the probe is capable of pivoting relative to the dual pivot axis-defining junction piece about a second pivot axis, a second arrangement, in which the shaft is prevented from pivoting relative to the dual pivot axis-defining junction piece, and the probe is capable of pivoting relative to the dual pivot axis-defining junction piece about the second pivot axis, a third arrangement, in which the probe is prevented from pivoting relative to the dual pivot axis-defining junction piece, and the shaft is capable of pivoting relative to the dual pivot axis-defining junction piece about the first pivot axis, and a fourth arrangement, in which the shaft is prevented from pivoting relative to the dual pivot axis-defining junction piece, and the probe is prevented from pivoting relative to the dual pivot axis-defining junction piece.

In some embodiments in accordance with the present inventive subject matter, including some embodiments that include or do not include any of the features described herein, a ground search metal detector comprises one or more connectors, and at least one of the connectors comprises a bolt and a nut (or a wingnut), and the respective threading on the bolt and the nut (or wingnut) extends to locations such that the nut (or wingnut) is not capable of being tightened beyond a desired degree (e.g., not to a degree at which one or more components is bent and/or not to a degree at which a user will have difficultly adjusting the nut (or wingnut).

Power can be provided to the transmit coil in any suitable way, e.g., through a wire connecting the coil to a power source, such as a battery.

As noted above, an advantageous aspect of the present inventive subject matter is that it reduces fatigue in users to an unexpectedly large degree. The reduction of fatigue achieved through use of ground search metal detectors in accordance with the present inventive subject matter can be demonstrated in many different ways. One representative example of a way fatigue can be tested is for one or more people to use a device in accordance with the present inventive subject matter, i.e., in which a probe is capable of pivoting relative to a dual pivot axis-defining junction piece about a first pivot axis, and a shaft is capable of pivoting relative to the dual pivot axis-defining junction piece about a second pivot axis, and, for comparison, the same person (or people) uses a device in which a probe is capable of pivoting relative to a shaft about a first pivot axis, and there is no other freedom of pivoting between the probe and any other component in the ground search metal detector. For example, a representative test comprises:

a first person uses a first device (in which a probe is capable of pivoting relative to a dual pivot axis-defining junction piece about a first pivot axis, and a shaft is capable of pivoting relative to the dual pivot axis-defining junction piece about a second pivot axis) on a first day, and uses the device until the first person reaches a level of fatigue at which the first person usually stops operating a ground search metal detector;

the first person uses a second device (in which a probe is capable of pivoting relative to a shaft about a first pivot axis, and there is no other freedom of pivoting between the probe and any other component in the ground search metal detector) on a second day, at least a week after the first day, and uses the device until the first person reaches a level of fatigue at which the first person usually stops operating a ground search metal detector;

a second person uses the second device on the first day, and uses the device until the second person reaches a level of fatigue at which the second person usually stops operating a ground search metal detector; and the second person uses the first device on the second day, and uses the device until the second person reaches a level of fatigue at which the second person usually stops operating a ground search metal detector.

By comparing the ratio of the length of time that the first person used the first device divided by the length of time that the first person used the second device, the reduction in fatigue provided by the present inventive subject matter is assessed (i.e., if the ratio is greater than 1, fatigue was reduced). Similarly, by comparing the ratio of the length of time that the second person used the first device divided by the length of time that the second person used the second device, the reduction in fatigue provided by the present inventive subject matter is assessed (i.e., again, if the ratio is greater than 1, fatigue was reduced).

An aspect of the present inventive subject matter is the recognition that with devices that provide only one axis of freedom of pivoting motion between a shaft and a probe, wherever and however the user wishes to position the search coil, the user's body must articulate to compensate for mechanical device limitations. Another advantageous aspect of the present inventive subject matter is that it provides a plane of motion functioning with the versatility and articulation controlled by the user, as compared with a device in which there is merely one axis of pivoting of the shaft relative to the probe. The benefits provided by the present inventive subject matter in this regard are two-fold. First is enhanced range of motion and resulting user benefits. Second is the benefit of ergonomic comfort and reduction of user physical fatigue.

An aspect of the present inventive subject matter is the recognition that devices that provide only one axis of freedom of pivoting motion between a shaft and a probe allow for a limited arc of motion in a singular range; users control the probe with body movement. The present inventive subject matter allows for easier articulation, resulting in less body movement being needed.

Another advantageous aspect of the present inventive subject matter is that it has been found that it is generally much easier for users to keep the probe parallel to the surface of the region being searched—when conditions permit keeping the probe in contact with the surface of the region being searched—in comparison to devices that provide only one axis of freedom of pivoting motion between a shaft and a probe.

Another advantageous aspect of the present inventive subject matter is that it has been found that generally less of a jolt to the ground search metal detector (and its components) occurs when the user hits something rigid and protruding from the surface of the region being searched (e.g., a large rock), in comparison to devices that provide only one axis of freedom of pivoting motion between a shaft and a probe.

Another advantageous aspect of the present inventive subject matter is that devices in accordance with the present inventive subject matter enable users to adjust the device to switch between (1) providing only one axis of freedom of pivoting motion between a shaft and a probe, and (2) providing dual axes of freedom of pivoting motion between the shaft and the probe (and in some cases, additionally (3) providing no axes of freedom of pivoting motion between the shaft and the probe). For example, in some instances, e.g., where a user is searching in a large grassy area (not tall grass) or any flat terrain such as a beach sand, making contact with the surface of the region being searched while moving along the surface rarely causes force to be applied to the probe, and providing dual axes of freedom of pivoting motion between the shaft and the probe provides the benefits described herein (e.g., less fatigue) without any drawbacks; if the user gets to a region with stiff and/or tall grass, the user might wish to switch to having only one axis of freedom, or no axis of freedom, of pivoting motion between the shaft and the probe, e.g., upon encountering a region with stiff and/or tall grass, where the user wants to force the probe through the grass, and dual axes of freedom of pivoting motion, or a single axis of freedom of pivoting motion, while doing so might result in the probe flopping (becoming non-parallel to the ground) to an undesirably large extent; if the user later gets to a rocky area (and/or an area with hills, bumps, lumps, or to an old stone foundation wall, an old house wall, a ceiling, etc.), the user might want to switch back to dual axis pivoting, to allow the probe to be moved to optimal sensing locations and orientations (e.g., in tight spaces and/or non-horizontal gaps) with less bodily movement by the user being required; if the user later gets to a region with rough and loose dirt (e.g., as in a plowed field), the user might wish to switch back to having only one axis of freedom of pivoting motion between the shaft and the probe, or no axis of freedom of pivoting motion between the shaft and the probe, e.g., to force the probe through the dirt.

Another advantageous aspect of the present inventive subject matter is that by providing dual axes of freedom of pivoting motion between a shaft and a probe, a user can more easily perform ground search metal detection in tight spaces (e.g., reaching under a house porch), making it possible to search in places that many people would skip if they were using a device that provides only one axis of freedom of pivoting motion between a shaft and a probe (especially if the user has already been operating the ground search metal detector for a significant period of time and is already fatigued, or has pain and/or physical mobility disadvantages present).

Another advantageous aspect of the present inventive subject matter is that with a device that provides for dual axes of freedom of pivoting motion between the shaft and the probe, it is easier for a user to perform searching in a grid pattern (e.g., moving side-to-side and steadily advancing to cover a generally rectangular area), or any other specific manipulation pattern or region (e.g., repeating shape), in comparison to doing so with a device that provides only one axis of freedom of pivoting motion between a shaft and a probe.

Another advantageous aspect of the present inventive subject matter is that with a device that provides for dual axes of freedom of pivoting motion between the shaft and the probe, it is easier for a user to perform searching in an "X" pattern (e.g., moving the probe in a first direction, and then moving the probe in a second direction that is nearly perpendicular to the first direction, with a point of intersection between the two directions of motion). Users often desire to search in an "X" pattern upon detecting a metallic item in the area being searched, in order to pinpoint the location of the metallic item (e.g., where the metallic item, such as a coin, is much smaller than the transmitter coil). Having the ability to search in an "X" pattern is increasingly more desirable, or necessary, as coil size is increased, and/or is also advantageous specifically for the popular "DD" double D type probes.

In some embodiments in accordance with the present inventive subject matter, including some embodiments that include or do not include any of the features described herein, the ground search metal detector further comprises an arm bracket (also referred to as an arm cuff). An arm bracket (in ground search metal detectors that comprise one) can be of any suitable shape and size, e.g., a semi-cylindrical shape that comfortably receives the back of a user's arm (e.g., triceps). An arm bracket can help a user to stabilize the ground search metal detector, and can provide easier and/or better control of the ground search metal detector. An arm bracket can be connected to the ground search metal detector in any suitable way, e.g., by being connected to an end of the shaft remote from the end that is attached to the probe.

In some embodiments in accordance with the present inventive subject matter, including some embodiments that include or do not include any of the features described herein, the ground search metal detector further comprises one or more handle. A first type of handle (in ground search metal detectors that comprise one or more handle) is one that is attached to the ground search metal detector, and that can be of any suitable shape, and can be attached to the ground search metal detector in any suitable way (e.g., a handle can be attached to an intermediate portion of the shaft, and can protrude from the shaft at a large angle, e.g., at least 70 degrees, at least 80 degrees, or close to or approximately 90 degrees). A second type of handle can be a portion of a shaft that is configured to extend at a large angle relative to a direction defined by the two ends of the shaft (i.e., in one orientation, upper and lower portions of the shaft are vertical or within 10 degrees of vertical, and an intermediate portion of the shaft, e.g., a bend in the shaft, is within 20 degrees of horizontal). A combination of a handle and an arm bracket can be very helpful for a user to stabilize and/or easily control the ground search metal detector.

In some embodiments in accordance with the present inventive subject matter, including some embodiments that include or do not include any of the features described herein, the ground search metal detector further comprises one or more controller that comprises a microprocessor, a battery, circuitry, controls, a display and/or a speaker, and that is configured to convey information from the ground search metal detector to the user, and/or to convey information and/or instructions from the user to the ground search metal detector, e.g., a display that indicates the size, depth, chemical nature of an object detected in the region being searched; an audible signal that indicates the presence of a buried metallic object or other electrically conductive object; a jack into which headphones can be plugged to provide an audible signal that indicates the presence of a buried metallic object or other electrically conductive object, and any other information that might be of use; sensitivity controls, etc. In ground search metal detectors that comprises one or more controllers, the controller(s) can be attached to the ground search metal detector in any way, e.g., it can be attached to an end of the handle that is remote from the end of the handle that is attached to the shaft.

The present inventive subject matter now will be described more fully hereinafter with reference to the accompanying drawings, in which embodiments of the inventive subject matter are shown. However, this inventive subject matter should not be construed as being limited to the embodiments set forth herein.

Figure 1:
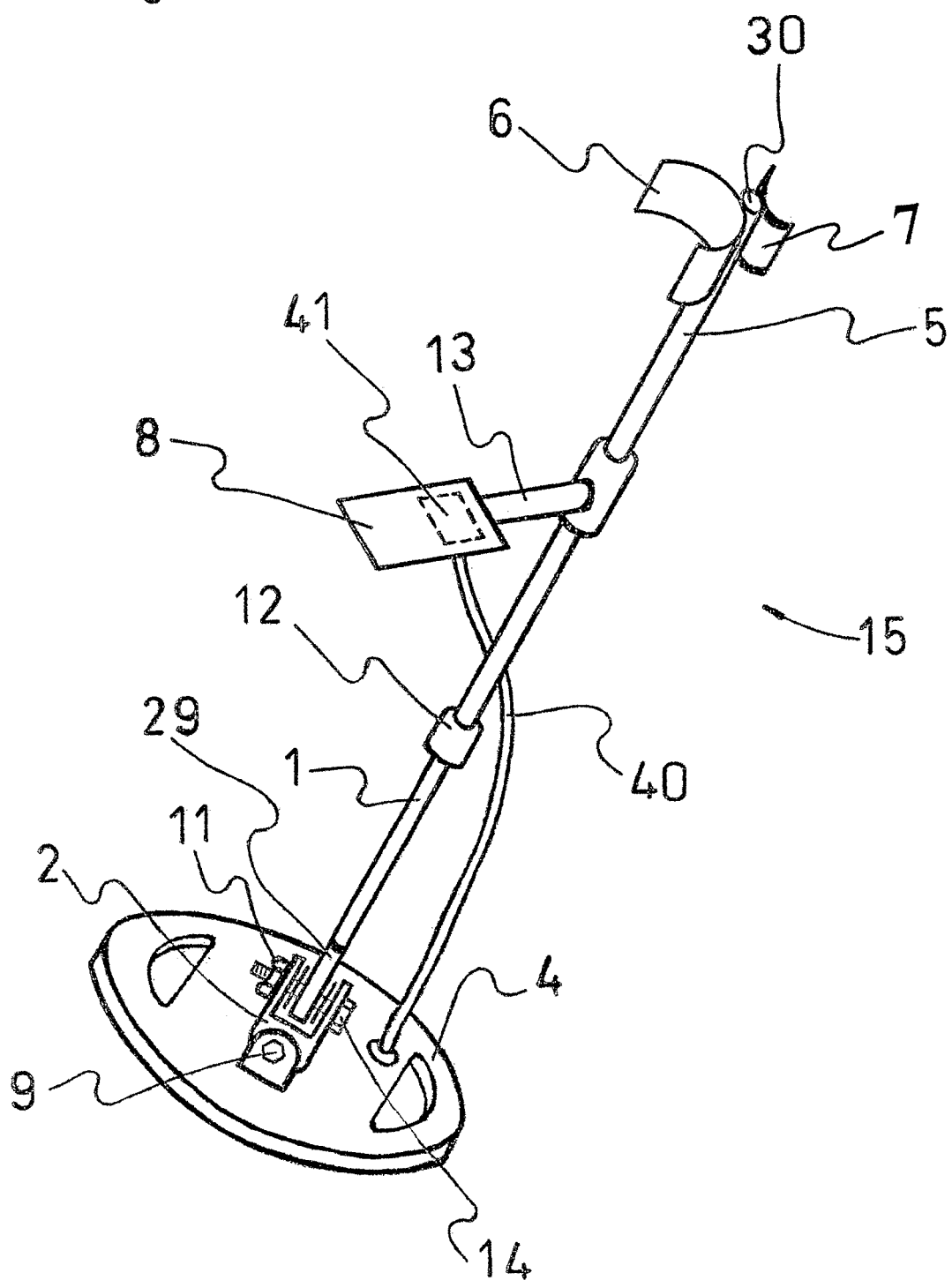
FIG. 1 is a schematic perspective view of a ground search metal detector 15.

FIG. 1 is a schematic perspective view of a first embodiment of a ground search metal detector 15 in accordance with the present inventive subject matter. The ground search metal detector 15 comprises a shaft that comprises a lower shaft portion 1, an upper shaft portion 5 and a tightening element (in the form of a compression locking nut 12), a probe 4, and a dual pivot axis-defining junction piece 2.

The shaft is attached to the dual pivot axis-defining junction piece 2, and the probe 4 is also attached to the dual pivot axis-defining junction piece 2.

The ground search metal detector 15 is configured to be adjusted between at least a first arrangement and a second arrangement (discussed below).

The ground search metal detector 15 further comprises at least a first connector in the form of a first bolt 14 and a first wingnut 11. The shaft is attached to the dual axis-defining junction piece 2 by the first connector.

Figure 2:
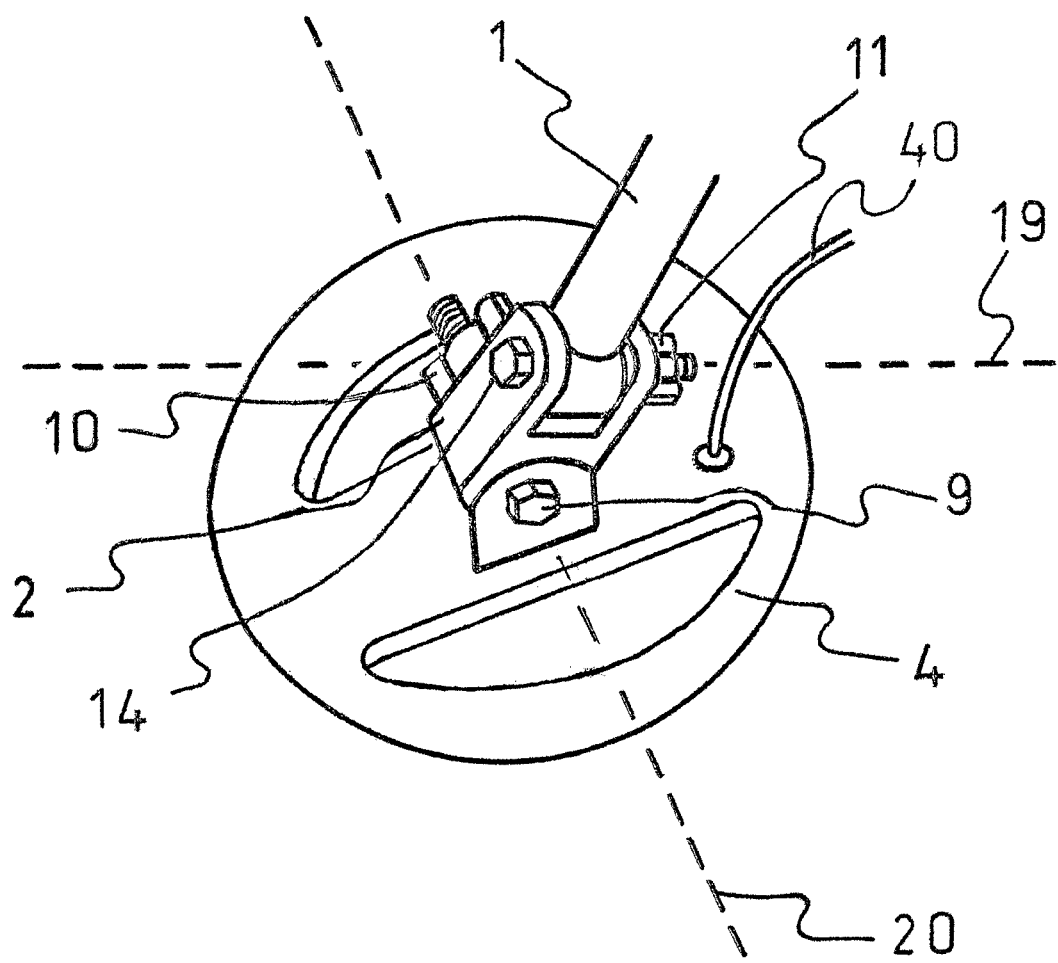
FIG. 2 is a schematic perspective view of a portion of the ground search metal detector depicted in FIG. 1.

The ground search metal detector 15 further comprises at least a second connector in the form of a second bolt 9 and a second wingnut 10 (see FIG. 2). The probe 4 is attached to the dual axis-defining junction piece 2 by the second connector.

In the first arrangement, the shaft is capable of pivoting relative to the dual pivot axis-defining junction piece 2 about a first pivot axis 19 (see FIG. 2), and the probe 4 is capable of pivoting relative to the dual pivot axis-defining junction piece 2 about a second pivot axis 20, the second pivot axis 20 non-parallel with respect to the first pivot axis 19.

In the second arrangement, the probe 4 is prevented from pivoting relative to the dual pivot axis-defining junction piece 2, as a result of the second wingnut 10 being tightened (by threading it on the second bolt 9) to a sufficient extent.

Figure 4:
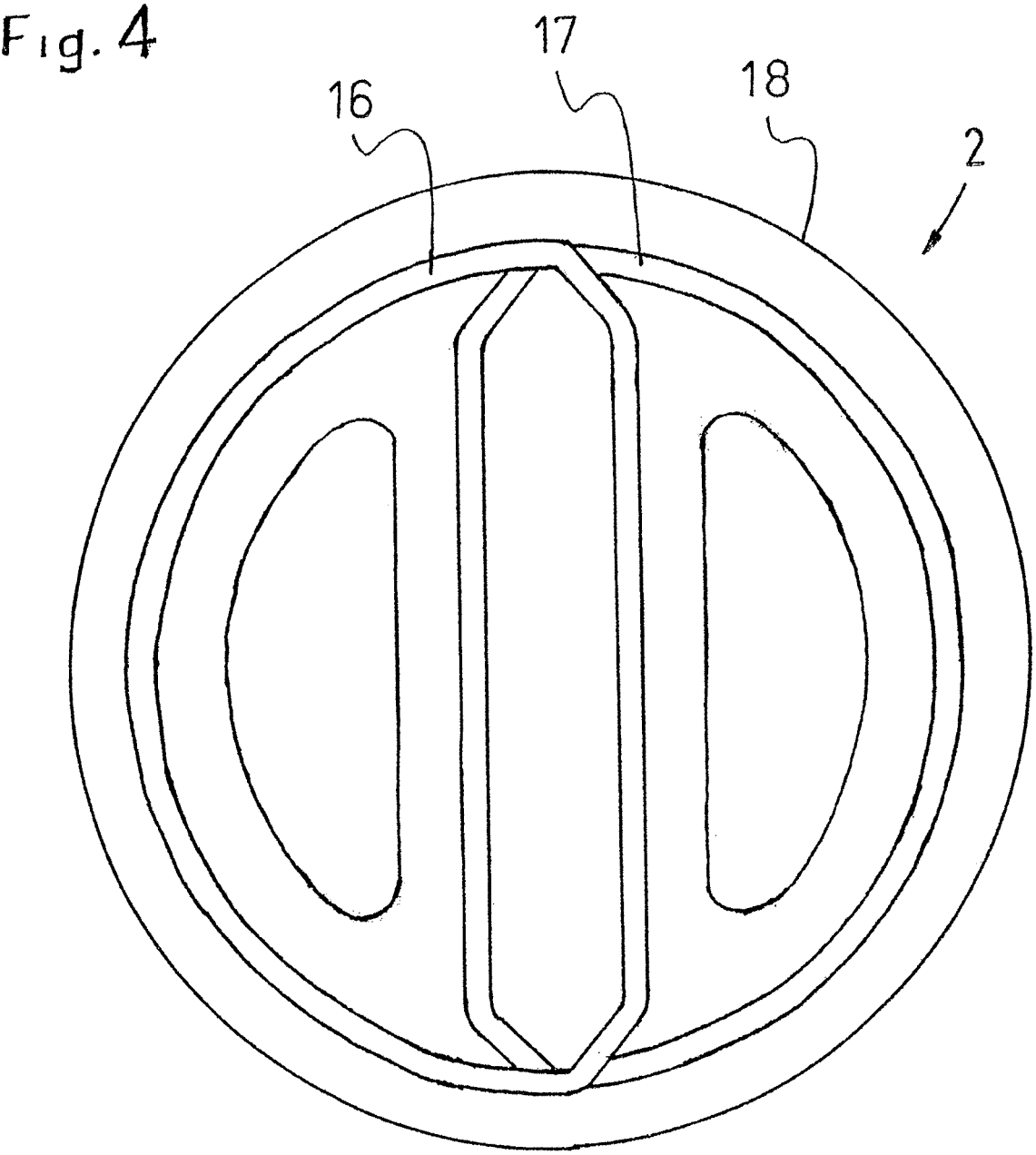
FIG. 4 is a cross-sectional view of the probe 2 of the ground search metal detector 15 depicted in FIG. 1.

FIG. 4 is a cross-sectional view of the probe 4. As shown in FIG. 4, the probe 4 comprises at least a first electromagnetic coil 16 (a transmitter coil) and a second electromagnetic coil 17 (a receiver coil), and a housing 18.

Figure 3:
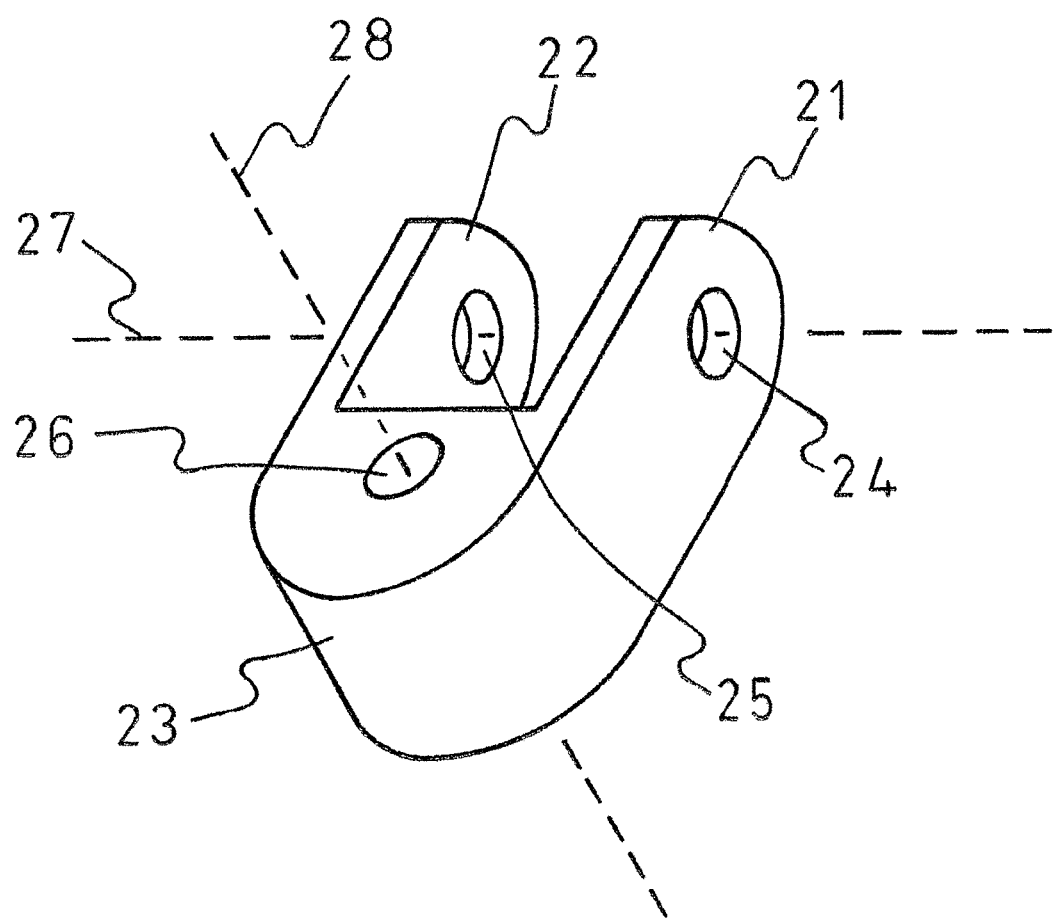
FIG. 3 is a perspective view of the dual pivot axis-defining junction piece 2 of the ground search metal detector 15 depicted in FIG. 1.

FIG. 3 is a perspective view of the dual pivot axis-defining junction piece 2. As shown in FIG. 3, the dual pivot axis-defining junction piece 2 comprises a first region 21, a second region 22 and a third region 23. The first region 21 comprises a substantially cylindrical first aperture 24; the second region 22 comprises a substantially cylindrical second aperture 25; and the third region 23 comprises a substantially cylindrical third aperture 26. The first aperture 24 defines an axis-defining region (which defines a first axis 27), the second aperture 25 defines an axis-defining region (which also defines the first pivot axis 27), and the third aperture 26 defines an axis-defining region (which defines a second pivot axis 28). The second pivot axis 28 is skew and substantially perpendicular to the first pivot axis 27.

Referring again to FIG. 1, the shaft comprises a shaft first end 29 and a shaft second end 30. The shaft first end 29 is within 4 inches of the first pivot axis 19, and the shaft second end 30 is at least 3 feet away from the shaft first end 29.

The ground search metal detector 15 further comprises an arm bracket 6 (which is attached to the shaft), and a support 7 (also attached to the shaft), e.g., for enabling a user to easily rest the shaft stably on the ground.

The ground search metal detector further comprises a handle 13 (which is attached to the shaft) and a controller 8 (which is attached to the handle 13).

Power is supplied to the coil 17 through a wire 40 (shown in FIG. 1) that is connected to a battery 41 in the controller 8. Power is supplied to other components in the controller 8 through electrical connections to the battery 41.

The first tightening element 12 is configured to be movable between a first tightening element first position and a first tightening element second position. With the first tightening element 12 in the first tightening element first position, the first shaft portion 5 can telescope relative to the second shaft portion 1 to alter the overall length of the shaft using a small force (e.g., less than 200 N). With the first tightening element 12 in the first tightening element second position, the first shaft portion 5 is not easily movable relative to the second shaft portion 1 (e.g., a force of at least 500 N, or at least 1,000 N, and in some cases much more, would be required).

Figure 5:
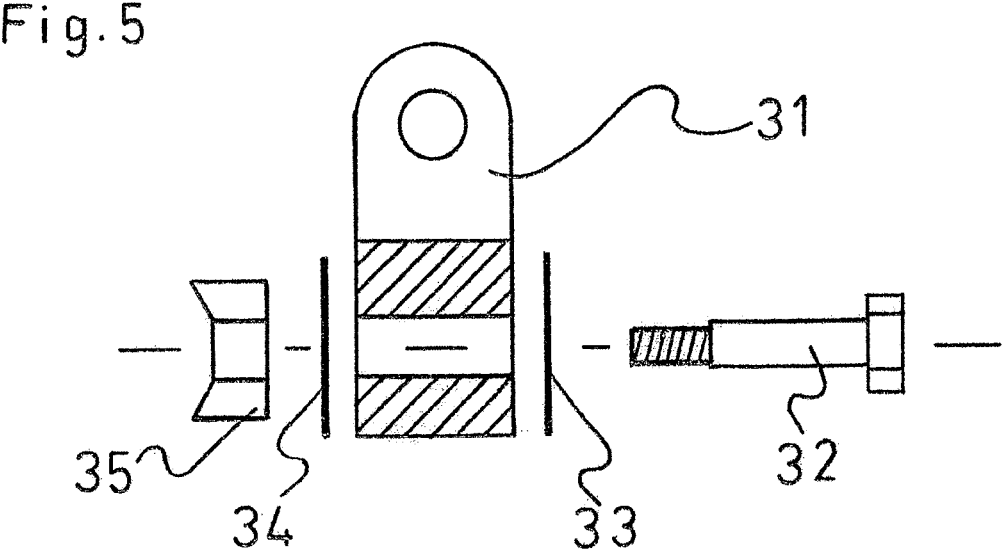
FIG. 5 is a cross-sectional exploded view of a dual pivot axis-defining junction piece 31 and a connector.

FIG. 5 is a cross-sectional exploded view of a dual pivot axis-defining junction piece 31 and a connector that comprises a first bolt 32, a first washer 33, a second washer 34 and a wingnut 35, which connector pivotally connects a probe (not shown) to the dual pivot axis-defining junction piece 31.

Figure 6:
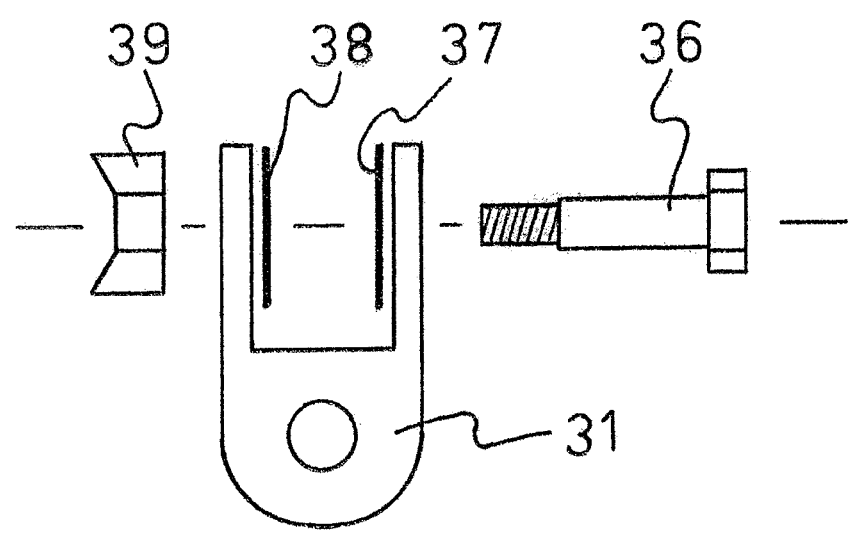
FIG. 6 is a cross-sectional exploded view of the dual pivot axis-defining junction piece 31 (rotated 90 degrees relative to the orientation depicted in FIG. 5) and a connector.

FIG. 6 is a cross-sectional exploded view of the dual pivot axis-defining junction piece 31 (rotated 90 degrees relative to the orientation depicted in FIG. 5) and a connector that comprises a second bolt 36, a first washer 37, a second washer 38 and a wingnut 39, which connector pivotally connects a shaft (not shown) to the dual pivot axis-defining junction piece 31. The second bolt 36 comprises full shoulder threads that do not extend to a distance where over-tightening could occur, in order to allow for tightening (but prevent over-tightening).

FIGS. 7-14 are schematic views of a portion of a second embodiment of a ground search metal detector 70 in accordance with the present inventive subject matter. The ground search metal detector 70 comprises a shaft 71, a dual pivot axis-defining junction piece 72, a probe 73, a first connector that comprises a first bolt 74 and a first wingnut 75, and a second connector that comprises a second bolt 76 and a second wingnut 77.

FIG. 7 is a front view of the portion of the ground search metal detector 70 in a first arrangement, and FIG. 8 is a side view of the portion of the ground search metal detector 70 in the first arrangement. In the first arrangement, the shaft 71 is capable of pivoting relative to the dual pivot axis-defining junction piece 72 about a first pivot axis, and the probe 73 is capable of pivoting relative to the dual pivot axis-defining junction piece 72 about a second pivot axis.

Figure 9:
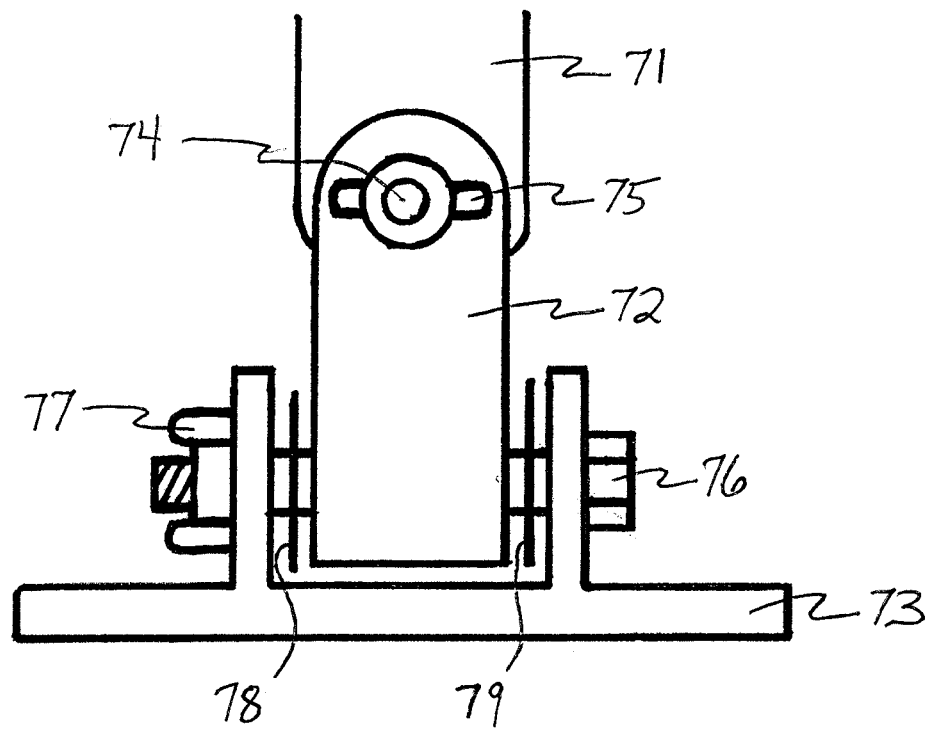
FIG. 9 is a front view of the portion of the ground search metal detector 70 in a second arrangement.
Figure 10:
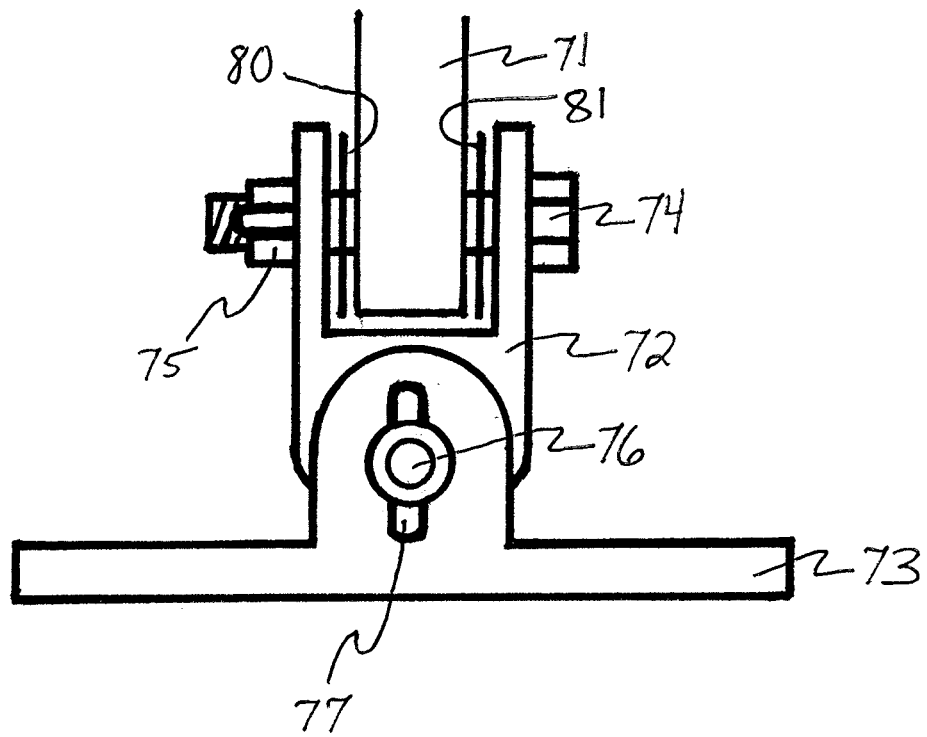
FIG. 10 is a side view of the portion of the ground search metal detector 70 in the second arrangement.

FIG. 9 is a front view of the portion of the ground search metal detector 70 in a second arrangement, and FIG. 10 is a side view of the portion of the ground search metal detector 70 in the second arrangement. In the second arrangement, the shaft 71 is prevented from pivoting relative to the dual pivot axis-defining junction piece 72 (as a result of the first wingnut 75 being tightened on the first bolt 74 to a sufficient degree), and the probe 73 is capable of pivoting relative to the dual pivot axis-defining junction piece 72 about the second pivot axis.

Figure 11:
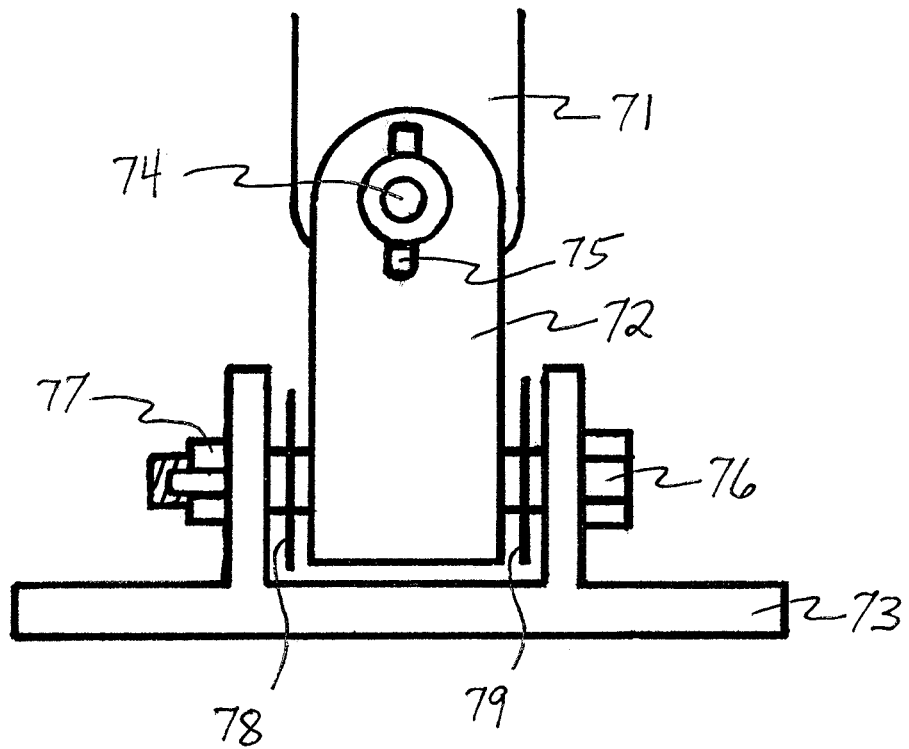
FIG. 11 is a front view of the portion of the ground search metal detector 70 in a third arrangement.
Figure 12:
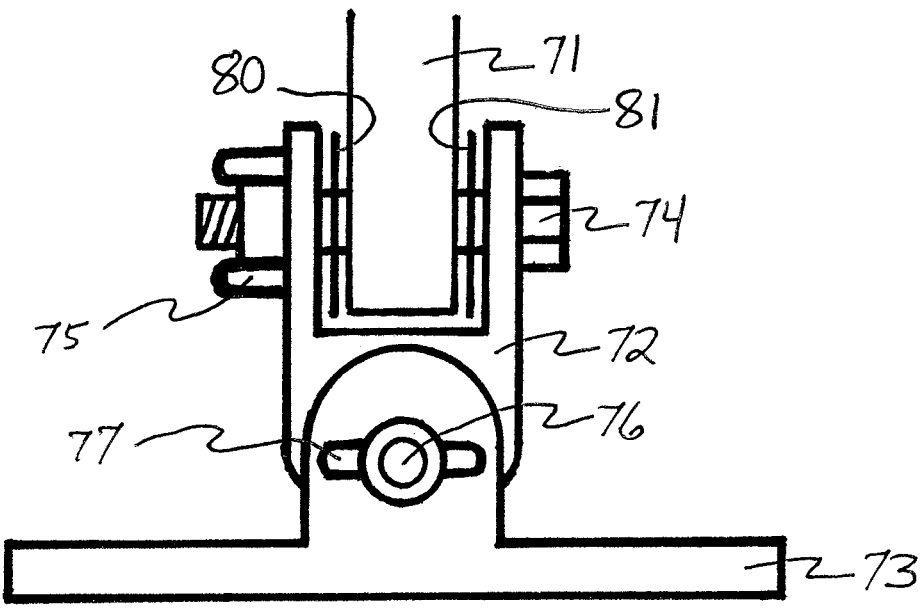
FIG. 12 is a side view of the portion of the ground search metal detector 70 in the third arrangement.

FIG. 11 is a front view of the portion of the ground search metal detector 70 in a third arrangement, and FIG. 12 is a side view of the portion of the ground search metal detector 70 in the third arrangement. In the third arrangement, the probe 73 is prevented from pivoting relative to the dual pivot axis-defining junction piece 72 (as a result of the second wingnut 77 being tightened on the second bolt 76 to a sufficient degree), and the shaft 71 is capable of pivoting relative to the dual pivot axis-defining junction piece 72 about the first pivot axis.

Figure 13:
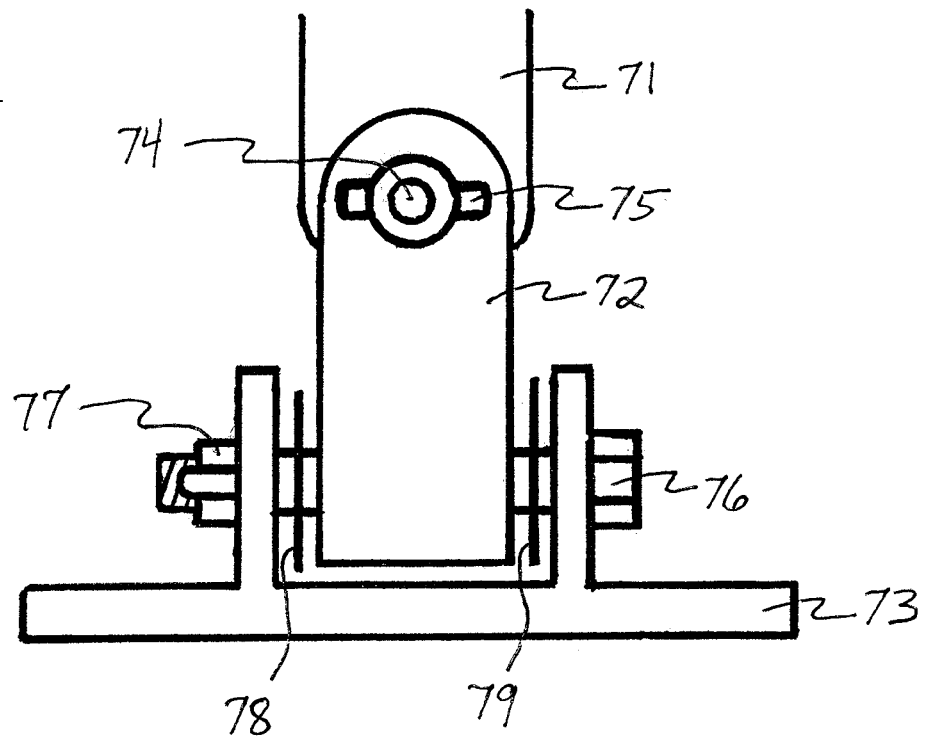
FIG. 13 is a front view of the portion of the ground search metal detector 70 in a fourth arrangement.
Figure 14:
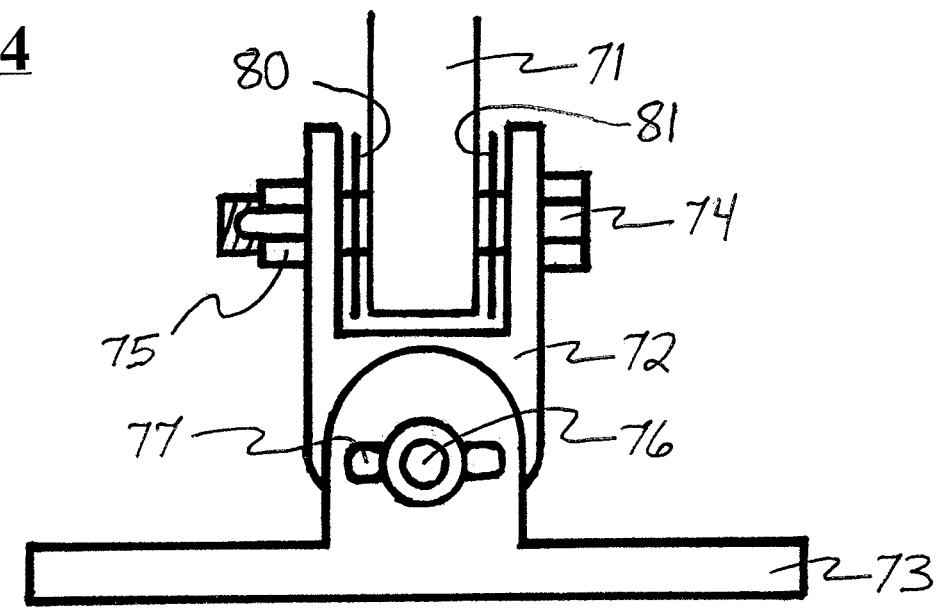
FIG. 14 is a side view of the portion of the ground search metal detector 70 in the fourth arrangement.

FIG. 13 is a front view of the portion of the ground search metal detector 70 in a fourth arrangement, and FIG. 14 is a side view of the portion of the ground search metal detector 70 in the fourth arrangement. In the fourth arrangement, the shaft 71 is prevented from pivoting relative to the dual pivot axis-defining junction piece 72 (as a result of the first wingnut 75 being tightened on the first bolt 74 to a sufficient degree), and the probe 73 is prevented from pivoting relative to the dual pivot axis-defining junction piece 72 (as a result of the second wingnut 77 being tightened on the second bolt 76 to a sufficient degree).

The second embodiment further comprises washers 78, 79, 80 and 81 (see FIGS. 7 and 8). Any number of washers of any desired widths can be substituted for either or both of the washers 78 and 79 in order to fill the spaces between the shaft 71 and the dual pivot axis-defining junction piece 72 to the extent desired, and similarly, any number of washers of any desired widths can be substituted for either or both of the washers 80 and 81 in order to fill the spaces between the probe 73 and the dual pivot axis-defining junction piece 72 to the extent desired.

FIG. 15 is a front view of the portion of the ground search metal detector 70 in the first arrangement, with the shaft 71 pivoted relative to the dual pivot axis-defining junction piece 72 to a pivot position that differs from its pivot position depicted in FIG. 7.

FIG. 16 is a front view of the portion of the ground search metal detector 70 in the first arrangement, with the probe 73 pivoted relative to the dual pivot axis-defining junction piece 72 to a pivot position that differs from its pivot position depicted in FIG. 8.

Embodiments in accordance with the present inventive subject matter are described herein in detail in order to provide exact features of representative embodiments that are within the overall scope of the present inventive subject matter. The present inventive subject matter is not limited to such detail.

While certain embodiments of the present inventive subject matter have been illustrated with reference to specific combinations of elements and attributes, various other combinations may also be provided without departing from the teachings of the present inventive subject matter. Thus, the present inventive subject matter should not be construed as being limited to the particular exemplary embodiments described herein and illustrated in the Figures, but may also encompass combinations of elements and attributes of the various illustrated embodiments.

Based on the information provided in the present disclosure, many alterations and modifications may be made by those having ordinary skill in the art, given the benefit of the present disclosure, without departing from the spirit and scope of the inventive subject matter.

The invention claimed is:

1. A ground search metal detector, comprising:
a shaft,
a probe, and
a dual pivot axis-defining junction piece, the dual pivot axis-defining junction piece is a one-piece structure,
the probe comprising at least a first electromagnetic coil,
the first electromagnetic coil configured to generate a magnetic field upon electric current being passed through the first electromagnetic coil,
the shaft attached to the dual pivot axis-defining junction piece,
the probe attached to the dual pivot axis-defining junction piece,
the ground search metal detector configured to be adjusted between at least a first arrangement and a second arrangement, wherein:
in the first arrangement:
the shaft is capable of pivoting relative to the dual pivot axis-defining junction piece about a first pivot axis, the first pivot axis does not extend through the probe, and
the probe is capable of pivoting relative to the dual pivot axis-defining junction piece about a second pivot axis, the second pivot axis does not extend through the probe, the second pivot axis non-parallel with respect to the first pivot axis, and
in the second arrangement:
the shaft is prevented from pivoting relative to the dual pivot axis-defining junction piece, and
the probe is capable of pivoting relative to the dual pivot axis-defining junction piece about the second pivot axis.

2. The ground search metal detector as recited in claim 1, wherein:
the ground search metal detector further comprises at least a first connector,
the shaft is attached to the dual axis-defining junction piece by the first connector,
the first connector is adjustable between at least a first connector pivotable arrangement and a first connector non-pivotable arrangement,
with the first connector in the first connector pivotable arrangement, the shaft is capable of pivoting relative to the dual pivot axis-defining junction piece about the first pivot axis,
with the first connector in the first connector non-pivotable arrangement, the shaft is prevented from pivoting relative to the dual pivot axis-defining junction piece.

3. The ground search metal detector as recited in claim 1, wherein:
the ground search metal detector is configured to be adjusted between the first arrangement, the second arrangement, and at least a third arrangement,
wherein in the third arrangement:
the shaft is prevented from pivoting relative to the dual pivot axis-defining junction piece, and
the probe is prevented from pivoting relative to the dual pivot axis-defining junction piece.

4. The ground search metal detector as recited in claim 1, wherein:
the ground search metal detector further comprises at least a first connector and a second connector,
the shaft is attached to the dual axis-defining junction piece by the first connector,
the first connector is adjustable between at least a first connector pivotable arrangement and a first connector non-pivotable arrangement,
the probe is attached to the dual axis-defining junction piece by the second connector,
the second connector is adjustable between at least a second connector pivotable arrangement and a second connector non-pivotable arrangement,
with the first connector in the first connector pivotable arrangement and the second connector in the second connector pivotable arrangement, the ground search metal detector is in the first arrangement,
with the first connector in the first connector non-pivotable arrangement and the second connector in the second connector pivotable arrangement, the ground search metal detector is in the second arrangement,
with the first connector in the first connector non-pivotable arrangement and the second connector in the second connector non-pivotable arrangement, the ground search metal detector is in the third arrangement.

5. The ground search metal detector as recited in claim 1, wherein:
the dual pivot axis-defining junction piece comprises a first pivot axis-defining region and a second pivot axis-defining region,
the first pivot axis-defining region defines the first pivot axis, and
the second pivot axis-defining region defines the second pivot axis.

6. The ground search metal detector as recited in claim 5, wherein:
the first pivot axis-defining region comprises at least a first substantially cylindrical aperture,
the second pivot axis-defining region comprises at least a second substantially cylindrical aperture.

7. The ground search metal detector as recited in claim 1, wherein the second pivot axis is skew and substantially perpendicular to the first pivot axis.

8. The ground search metal detector as recited in claim 1, wherein:
the shaft comprises a shaft first end and a shaft second end,
the shaft first end is within 4 inches of the first pivot axis, and
the shaft second end is at least 3 feet away from the shaft first end.

9. The ground search metal detector as recited in claim 1, wherein:
the ground search metal detector further comprises an arm bracket, and
the arm bracket is attached to the shaft.

10. The ground search metal detector as recited in claim 1, wherein:
the ground search metal detector further comprises a controller, and
the controller is attached to the shaft.

11. The ground search metal detector as recited in claim 1, wherein:
the shaft comprises at least a first shaft portion, a second shaft portion, and at least a first tightening element,
the first tightening element is configured to be movable between a first tightening element first position and a first tightening element second position,
with the first tightening element in the first tightening element first position, the first shaft portion is movable relative to the second shaft portion to alter the overall length of the shaft using a force of less than 200 N, and
with the first tightening element in the first tightening element second position, the first shaft portion is not movable relative to the second shaft portion using a force of less than 300 N.

12. A ground search metal detector, comprising:
a shaft,
a probe, and
a dual pivot axis-defining junction piece, the dual pivot axis-defining junction piece is a one-piece structure,
the probe comprising at least a first electromagnetic coil,
the first electromagnetic coil configured to generate a magnetic field upon electric current being passed through the first electromagnetic coil,
the shaft attached to the dual pivot axis-defining junction piece,
the probe attached to the dual pivot axis-defining junction piece,
the ground search metal detector configured to be adjusted between at least a first arrangement and a second arrangement, wherein:
in the first arrangement:
the shaft is capable of pivoting relative to the dual pivot axis-defining junction piece about a first pivot axis, the first pivot axis does not extend through the probe, and
the probe is capable of pivoting relative to the dual pivot axis-defining junction piece about a second pivot axis, the second pivot axis does not extend through the probe, the second pivot axis non-parallel with respect to the first pivot axis, and
in the second arrangement:
the probe is prevented from pivoting relative to the dual pivot axis-defining junction piece, and
the shaft is capable of pivoting relative to the dual pivot axis-defining junction piece about the first pivot axis.

13. The ground search metal detector as recited in claim 12, wherein:
the ground search metal detector further comprises at least a first connector,
the dual axis-defining junction piece is attached to the probe by the first connector,
the first connector is adjustable between at least a first connector pivotable position and a first connector non-pivotable position,
with the first connector in the first connector pivotable position, the probe is capable of pivoting relative to the dual pivot axis-defining junction piece about the second pivot axis,
with the first connector in the first connector non-pivotable position, the probe is prevented from pivoting relative to the dual pivot axis-defining junction piece.

14. The ground search metal detector as recited in claim 12, wherein:
the dual pivot axis-defining junction piece comprises a first pivot axis-defining region and a second pivot axis-defining region,
the first pivot axis-defining region defines the first pivot axis, and
the second pivot axis-defining region defines the second pivot axis.

15. The ground search metal detector as recited in claim 14, wherein:
the first pivot axis-defining region comprises at least a first substantially cylindrical aperture,
the second pivot axis-defining region comprises at least a second substantially cylindrical aperture.

16. The ground search metal detector as recited in claim 12, wherein the second pivot axis is skew and substantially perpendicular to the first pivot axis.

17. A probe assembly for a ground search metal detector, the probe assembly comprising:
a probe,
a dual pivot axis-defining junction piece, and
at least a first connector,
the probe comprising at least a first electromagnetic coil,
the first electromagnetic coil configured to generate a magnetic field upon electric current being passed through the first electromagnetic coil,
the probe attached to the dual pivot axis-defining junction piece,
the dual pivot axis-defining junction piece is a one-piece structure comprising a first region and a second region, the first region defining at least a first substantially cylindrical space, the first substantially cylindrical space having a first axis of substantial symmetry, the second region defining at least a second substantially cylindrical space, the second substantially cylindrical space having a second axis of substantial symmetry, the second axis of substantial symmetry skew and substantially perpendicular with respect to the first axis of substantial symmetry, the dual axis-defining junction piece is attached to the probe by the first connector, the first connector is adjustable between at least a first connector pivotable position and a first connector non-pivotable position, with the first connector in the first connector pivotable position, the probe is capable of pivoting relative to the dual pivot axis-defining junction piece about the first axis of substantial symmetry, with the first connector in the first connector non-pivotable position, the probe is prevented from pivoting relative to the dual pivot axis-defining junction piece.

18. A method of searching for ground metal, comprising:
causing a shaft of a ground search metal detector to pivot relative to a dual pivot axis-defining junction piece about a first pivot axis, the ground search metal detector comprising the shaft, the dual pivot axis-defining junction piece, and a probe, the probe comprising at least a first electromagnetic coil, the first electromagnetic coil configured to generate a magnetic field upon electric current being passed through the first electromagnetic coil, causing the probe of the ground search metal detector to pivot relative to the dual pivot axis-defining junction piece about a second pivot axis, the second pivot axis non-parallel with respect to the first pivot axis, the dual pivot axis-defining junction piece is a one-piece structure comprising a first pivot axis-defining region and a second pivot axis-defining region, the first pivot axis-defining region defines the first pivot axis, the first pivot axis does not extend through the probe, and the second pivot axis-defining region defines the second pivot axis, the second pivot axis does not extend through the probe.

19. The method as recited in claim 18, wherein:
the first pivot axis-defining region comprises at least a first substantially cylindrical aperture,
the second pivot axis-defining region comprises at least a second substantially cylindrical aperture.

20. The method as recited in claim 18, wherein the second pivot axis is skew and substantially perpendicular to the first pivot axis.

21. A method of searching for ground metal, comprising:
adjusting a first connector from a first connector pivotable arrangement to a first connector non-pivotable arrangement, the first connector attaching a shaft of a ground search metal detector to a dual axis-defining junction piece of the ground search metal detector, the ground search metal detector comprising the first connector, the shaft, the dual axis-defining junction piece and a probe, the probe comprising at least a first electromagnetic coil, the first electromagnetic coil configured to generate a magnetic field upon electric current being passed through the first electromagnetic coil, the probe attached to the dual pivot axis-defining junction piece, the dual pivot axis-defining junction piece is a one-piece structure, the probe capable of pivoting relative to the dual pivot axis-defining junction piece about a first pivot axis, the first pivot axis does not extend through the probe, with the first connector in the first connector pivotable arrangement, the shaft is capable of pivoting relative to the dual pivot axis-defining junction piece about a second pivot axis, the second pivot axis does not extend through the probe, the second pivot axis non-parallel with respect to the first pivot axis, and with the first connector in the first connector non-pivotable arrangement, the shaft is prevented from pivoting relative to the dual pivot axis-defining junction piece.

22. The method as recited in claim 21, wherein the second pivot axis is skew and substantially perpendicular to the first pivot axis.

23. The method as recited in claim 21, wherein:
the dual pivot axis-defining junction piece comprises a first pivot axis-defining region and a second pivot axis-defining region,
the first pivot axis-defining region defines the first pivot axis, and
the second pivot axis-defining region defines the second pivot axis.

24. A method of searching for ground metal, comprising:
adjusting a first connector from a first connector pivotable arrangement to a first connector non-pivotable arrangement, the first connector attaching a probe of a ground search metal detector to a dual axis-defining junction piece of the ground search metal detector, the ground search metal detector comprising the first connector, the probe, the dual axis-defining junction piece and a shaft, the probe comprising at least a first electromagnetic coil, the first electromagnetic coil configured to generate a magnetic field upon electric current being passed through the first electromagnetic coil, the shaft attached to the dual pivot axis-defining junction piece, the dual pivot axis-defining junction piece is a one-piece structure, the shaft capable of pivoting relative to the dual pivot axis-defining junction piece about a first pivot axis, the first pivot axis does not extend through the probe, with the first connector in the first connector pivotable arrangement, the probe is capable of pivoting relative to the dual pivot axis-defining junction piece about a second pivot axis, the second pivot axis does not extend through the probe, the second pivot axis non-parallel with respect to the first pivot axis, and with the first connector in the first connector non-pivotable arrangement, the probe is prevented from pivoting relative to the dual pivot axis-defining junction piece.

25. The method as recited in claim 24, wherein the second pivot axis is skew and substantially perpendicular to the first pivot axis.

26. The method as recited in claim 24, wherein:
the dual pivot axis-defining junction piece comprises a first pivot axis-defining region and a second pivot axis-defining region,
the first pivot axis-defining region defines the first pivot axis, and
the second pivot axis-defining region defines the second pivot axis.

* * * * *